(12) United States Patent
Fan et al.

(10) Patent No.: US 11,728,523 B2
(45) Date of Patent: Aug. 15, 2023

(54) RECHARGEABLE BATTERY WITH RESISTIVE LAYER FOR ENHANCED SAFETY

(71) Applicant: American Lithium Energy Corporation, Carlsbad, CA (US)

(72) Inventors: Jiang Fan, San Diego, CA (US); Dengguo Wu, San Diego, CA (US)

(73) Assignee: American Lithium Energy Corporation, Carlsbad, CA (US)

( * ) Notice: Subject to any disclaimer, the term of this patent is extended or adjusted under 35 U.S.C. 154(b) by 238 days.

(21) Appl. No.: 17/068,678

(22) Filed: Oct. 12, 2020

(65) Prior Publication Data

US 2021/0226262 A1 Jul. 22, 2021

Related U.S. Application Data

(63) Continuation of application No. 16/003,953, filed on Jun. 8, 2018, now Pat. No. 10,840,560, which is a (Continued)

(51) Int. Cl.
*H01M 50/581* (2021.01)
*H01M 10/42* (2006.01)
(Continued)

(52) U.S. Cl.
CPC ......... *H01M 10/4235* (2013.01); *H01M 4/13* (2013.01); *H01M 4/366* (2013.01);
(Continued)

(58) Field of Classification Search
CPC ........ H01M 4/13; H01M 4/366; H01M 4/628; H01M 10/0525; H01M 50/581
See application file for complete search history.

(56) References Cited

U.S. PATENT DOCUMENTS 2,664,481 A   12/1953  Pearl et al.
4,075,400 A   2/1978   Fritts
(Continued)

FOREIGN PATENT DOCUMENTS

CN   1121264 A    4/1996
CN   103194161 A  7/2013
(Continued)

OTHER PUBLICATIONS

Eichstadt, Amy E., et al. "Structure-Property Relationships fora Series of Amorphous Partially Aliphatic Polyimides." *Journal of Polymer Science Part B: Polymer Physics* 40.14 (2002): 1503-1512.
(Continued)

*Primary Examiner* — Ula C Ruddock
*Assistant Examiner* — Scott J. Chmielecki
(74) *Attorney, Agent, or Firm* — Jones Day

(57) ABSTRACT

An improved high energy density rechargeable (HEDR) battery with an anode energy layer, a cathode energy layer, a separator between the anode and cathode energy layers for preventing internal discharge thereof, and at least one current collector for transferring electrons to and from either the anode or cathode energy layer, includes a resistive layer interposed between the separator and one of the current collectors for limiting the rate of internal discharge through the failed separator in the event of separator failure. The resistive layer has a fixed resistivity at temperatures between a preferred temperature range and an upper temperature safety limit for operating the battery. The resistive layer serves to avoid temperatures in excess of the upper temperature safety limit in the event of separator failure in the battery, and a fixed resistivity of the resistive layer is greater than the internal resistivity of either energy layer.

20 Claims, 16 Drawing Sheets

| Cathode Current Collector | 101 |
|---|---|
| Cathode Energy Layer | 102 |
| Separator | 103 |
| Anode Energy Layer | 104 |
| Resistive Layer | 108 |
| Anode Current Collector | 105 |

| Cathode Current Collector | 101 |
|---|---|
| Cathode Energy Layer | 102 |
| Separator | 103 |
| Resistive Layer | 108 |
| Anode Energy Layer | 104 |
| Anode Current Collector | 105 |

Related U.S. Application Data continuation of application No. 14/952,754, filed on Nov. 25, 2015, now Pat. No. 10,020,545.

(60) Provisional application No. 62/114,508, filed on Feb. 10, 2015, provisional application No. 62/114,001, filed on Feb. 9, 2015, provisional application No. 62/084,454, filed on Nov. 25, 2014.

(51) Int. Cl.

| | |
|---|---|
| *H01M 10/0525* | (2010.01) |
| *H01M 4/13* | (2010.01) |
| *H01M 4/36* | (2006.01) |
| *H01M 4/62* | (2006.01) |

(52) U.S. Cl.
CPC ....... *H01M 4/628* (2013.01); *H01M 10/0525* (2013.01); *H01M 50/581* (2021.01)

(56) References Cited

U.S. PATENT DOCUMENTS

| | | | |
|---|---|---|---|
| 4,361,799 A | 11/1982 | Lutz | |
| 4,456,631 A | 6/1984 | Crosbie et al. | |
| 4,541,735 A | 9/1985 | Abu-Isa | |
| 4,975,341 A | 12/1990 | Tucholski et al. | |
| 5,188,909 A | 2/1993 | Pedicini | |
| 5,504,128 A | 4/1996 | Mizutani et al. | |
| 5,507,842 A | 4/1996 | Fiorino | |
| 5,754,090 A | 5/1998 | Arensmeier | |
| 5,776,627 A | 7/1998 | Mao et al. | |
| 6,005,469 A | 12/1999 | Kalapodis et al. | |
| 6,078,244 A | 6/2000 | Quinn et al. | |
| 6,084,501 A | 7/2000 | Plasko | |
| 6,181,545 B1 | 1/2001 | Amatucci et al. | |
| 6,191,679 B1 | 2/2001 | Kalapodis et al. | |
| 6,342,826 B1 | 1/2002 | Quinn et al. | |
| 6,387,570 B1 | 5/2002 | Nakamura et al. | |
| 6,570,749 B1 | 5/2003 | Ling et al. | |
| 6,576,373 B1 | 6/2003 | Iwamoto et al. | |
| 6,780,544 B2 | 8/2004 | Noh | |
| 7,203,049 B2 | 4/2007 | Chu et al. | |
| 7,390,589 B2 | 6/2008 | Shin et al. | |
| 8,021,788 B2 | 9/2011 | Kim et al. | |
| 8,754,740 B2 | 6/2014 | Pinto et al. | |
| 8,841,011 B2 | 9/2014 | Jang | |
| 9,627,722 B1 | 4/2017 | Fan et al. | |
| 9,806,382 B1 | 10/2017 | Fan et al. | |
| 2005/0079422 A1 | 4/2005 | Ko et al. | |
| 2006/0099506 A1 | 5/2006 | Krause et al. | |
| 2007/0166609 A1 | 7/2007 | Lee et al. | |
| 2007/0210893 A1* | 9/2007 | Hasunuma | H01M 50/572 429/62 |
| 2007/0269718 A1 | 11/2007 | Krause et al. | |
| 2008/0116423 A1 | 5/2008 | Fan et al. | |
| 2008/0241684 A1* | 10/2008 | Muraoka | H01M 50/46 427/58 |
| 2008/0254343 A1 | 10/2008 | Kaplin et al. | |
| 2008/0292939 A1 | 11/2008 | Xie | |
| 2009/0027158 A1* | 1/2009 | Kajino | H01C 7/02 29/612 |
| 2010/0047674 A1 | 2/2010 | Ryu et al. | |
| 2010/0099022 A1 | 4/2010 | Nishida et al. | |
| 2010/0143753 A1 | 6/2010 | Kim et al. | |
| 2010/0167107 A1 | 7/2010 | Byun et al. | |
| 2010/0247987 A1* | 9/2010 | Holung | B60L 3/04 429/62 |
| 2011/0045321 A1 | 2/2011 | Park et al. | |
| 2011/0052950 A1 | 3/2011 | Yoo | |
| 2011/0117403 A1 | 5/2011 | Hermann et al. | |
| 2011/0151293 A1 | 6/2011 | Kim et al. | |
| 2011/0157755 A1 | 6/2011 | Honkura | |
| 2011/0217589 A1 | 9/2011 | Kobayashi et al. | |
| 2011/0256443 A1* | 10/2011 | Park | H01M 50/417 429/144 |
| 2011/0273807 A1 | 11/2011 | Kim et al. | |
| 2011/0273809 A1 | 11/2011 | Falsett et al. | |
| 2012/0056709 A1 | 3/2012 | Kajino et al. | |
| 2012/0058375 A1 | 3/2012 | Tanaka et al. | |
| 2012/0068127 A1 | 3/2012 | Kawase et al. | |
| 2012/0121974 A1 | 5/2012 | Tikhonov et al. | |
| 2012/0189881 A1 | 7/2012 | Geoffroy et al. | |
| 2013/0004811 A1* | 1/2013 | Banerjee | H01M 6/5044 374/185 |
| 2013/0101869 A1 | 4/2013 | Farmer | |
| 2013/0130075 A1* | 5/2013 | Kim | H01M 50/581 429/62 |
| 2013/0171502 A1 | 7/2013 | Chen et al. | |
| 2013/0216867 A1 | 8/2013 | Schaefer et al. | |
| 2014/0072851 A1 | 3/2014 | Oh et al. | |
| 2014/0168845 A1 | 6/2014 | Charles | |
| 2014/0178753 A1* | 6/2014 | Chu | H01M 4/62 429/211 |
| 2014/0295248 A1 | 10/2014 | Hotta et al. | |
| 2014/0377629 A1* | 12/2014 | Miyazaki | H01M 50/489 429/144 |
| 2015/0050544 A1* | 2/2015 | Nam | H01M 50/411 429/144 |
| 2015/0104681 A1* | 4/2015 | Wang | H01M 4/64 429/61 |
| 2015/0280241 A1* | 10/2015 | Hara | H01M 4/668 429/233 |
| 2015/0303484 A1* | 10/2015 | Iida | H01G 11/24 429/233 |
| 2015/0311001 A1* | 10/2015 | Kato | H01G 11/06 429/217 |
| 2016/0059732 A1* | 3/2016 | Loftus | B60L 58/22 903/907 |
| 2016/0149196 A1 | 5/2016 | Fan et al. | |
| 2016/0149199 A1 | 5/2016 | Fan | |
| 2016/0149268 A1 | 5/2016 | Fan et al. | |
| 2016/0149269 A1 | 5/2016 | Fan et al. | |
| 2016/0164065 A1 | 6/2016 | Liu et al. | |
| 2016/0172657 A1* | 6/2016 | Matsui | H01M 4/62 429/61 |
| 2016/0181590 A1 | 6/2016 | Fan et al. | |
| 2016/0240836 A1* | 8/2016 | Aotani | H01M 50/581 |
| 2016/0254545 A1 | 9/2016 | Sugita et al. | |
| 2016/0268646 A1* | 9/2016 | Wang | H01M 50/543 |
| 2016/0322641 A1* | 11/2016 | Saito | H01M 4/667 |
| 2016/0365613 A1 | 12/2016 | Fan | |
| 2016/0372749 A1* | 12/2016 | Iida | C01G 53/50 |
| 2016/0380307 A1 | 12/2016 | Akita et al. | |
| 2017/0207440 A1 | 7/2017 | Hama et al. | |
| 2017/0365840 A1 | 12/2017 | Fan et al. | |
| 2018/0019505 A1 | 1/2018 | Fan et al. | |
| 2018/0190967 A1 | 7/2018 | Fan et al. | |
| 2018/0294472 A1 | 10/2018 | Fan | |
| 2019/0013553 A1 | 1/2019 | Fan et al. | |
| 2019/0058198 A1 | 2/2019 | Fan et al. | |

FOREIGN PATENT DOCUMENTS

| | | |
|---|---|---|
| CN | 104078276 A | 10/2014 |
| CN | 104937320 A | 9/2015 |
| CN | 105680086 A | 6/2016 |
| CN | 106030751 A | 10/2016 |
| EP | 0450549 A1 | 10/1991 |
| EP | 0776058 A2 | 5/1997 |
| EP | 1246280 A2 | 10/2002 |
| JP | 7220755 A2 | 8/1995 |
| JP | H07-220755 A | 8/1995 |
| JP | H09 320568 A | 12/1997 |
| JP | 2000-077061 A | 3/2000 |
| JP | 2005-011540 A | 1/2005 |
| JP | 2007-280803 A | 10/2007 |
| JP | 2010-146726 A | 7/2010 |
| JP | 2012-074359 A | 4/2012 |
| KR | 20130123492 A | 11/2013 |
| TW | 200601656 A | 1/2006 |
| WO | WO-2004/049494 A1 | 6/2004 |

(56) References Cited

FOREIGN PATENT DOCUMENTS

| WO | WO-2015/046469 A1 | 4/2015 |
| WO | WO-2015/060175 A1 | 4/2015 |
| WO | WO-2016/086184 A1 | 6/2016 |

OTHER PUBLICATIONS

Fang, Xingzhong, et al. "Synthesis and properties of polyimides derived from cis-and trans-1, 2, 3, 4-cyclohexanetetracarboxylic dianhydrides." *Polymer* 45.8 (2004): 2539-2549.

Fisher, D.J. (2018)"Negative Thermal Expansion Materials." Jan. 15, 2018, Materials Research Forum LLC, p. 7, p. 86. 11 pages.

International Search Report and Written Opinion issued in International Application No. PCT/2015/062767, dated Feb. 12, 2016. 14 pages.

Jeon, Jong-Young, and Tae-Moon Tak. "Synthesis of Aliphatic-Aromatic Polyimides by Two-Step Polymerization of Aliphatic Dianhydride and Aromatic Diamine." *Journal of Applied Polymer Science* 60.11 (1996): 1921-1926.

Loncrini, D. F., and J. M. Witzel. "Polyaryleneimides of meso-and dl-1, 2, 3, 4-Butanetetracarboxylic Acid Dianhydrides." *Journal of Polymer Science Part A—1: Polymer Chemistry* 7.8 (1969): 2185-2193.

Matsumoto, Toshihiko. "Aliphatic polyimides derived from polyalicyclic monomers." *High Performance Polymers* 13.2 (2001): S85-S92.

Schab-Balcerzak, E., et al. "Synthesis and characterization of organosoluble aliphatic-aromatic copolyimides based on cycloaliphatic dianhydride." *European Polymer Journal* 38.3 (2002): 423-430.

Seino, Hiroshi, Amane Mochizuki, and Mitsuru Ueda. "Synthesis of Aliphatic Polyimides Containing Adamantyl Units." *Journal of Polymer Science Part A Polymer Chemistry* 37.18 (1999): 3584-3590.

Seino, Hiroshi, et al. "Synthesis of fully aliphatic polyimides." *High Performance Polymers* 11.3 (1999): 255-262.

Spotnitz, R., and J. Franklin. "Abuse behavior of high-power, lithium-ion cells." *Journal of Power Sources* 113.1 (2003): 81-100.

\* cited by examiner

FIG. 1A

| Cathode Current Collector | 101 |
| Cathode Energy Layer | 102 |
| Separator | 103 |
| Anode Energy Layer | 104 |
| Resistive Layer | 108 |
| Anode Current Collector | 105 |

FIG. 1B

| Cathode Current Collector | 101 |
| Cathode Energy Layer | 102 |
| Separator | 103 |
| Resistive Layer | 108 |
| Anode Energy Layer | 104 |
| Anode Current Collector | 105 |

FIG. 1C

| Cathode Current Collector | 101 |
| Cathode Energy Layer | 102 |
| Separator | 103 |
| First Anode Energy Layer | 106 |
| Resistive Layer | 108 |
| Second Anode Energy Layer | 107 |
| Anode Current Collector | 105 |

FIG. 1D

| Cathode Current Collector | 101 |
| Resistive Layer | 108 |
| Cathode Energy Layer | 102 |
| Separator | 103 |
| Anode Energy Layer | 104 |
| Anode Current Collector | 105 |

FIG. 1E

| Cathode Current Collector | 101 |
| Cathode Energy Layer | 102 |
| Resistive Layer | 108 |
| Separator | 103 |
| Anode Energy Layer | 104 |
| Anode Current Collector | 105 |

FIG. 1F

| Cathode Current Collector | 101 |
| First Cathode Energy Layer | 109 |
| Resistive Layer | 108 |
| Second Cathode Energy Layer | 110 |
| Separator | 103 |
| Anode Energy Layer | 104 |
| Anode Current Collector | 105 |

FIG. 1G

| Cathode Current Collector | 101 |
| Resistive Layer | 111 |
| Cathode Energy Layer | 102 |
| Separator | 103 |
| Anode Energy Layer | 104 |
| Resistive Layer | 112 |
| Anode Current Collector | 105 |

FIG. 1H

| Cathode Current Collector | 101 |
| Resistive Layer | 111 |
| Cathode Energy Layer | 102 |
| Separator | 103 |
| Resistive Layer | 112 |
| Anode Energy Layer | 104 |
| Anode Current Collector | 105 |

| Cathode Current Collector | 101 |
|---|---|
| Cathode Energy Layer | 102 |
| Resistive Layer | 111 |
| Separator | 103 |
| Resistive Layer | 112 |
| Anode Energy Layer | 104 |
| Anode Current Collector | 105 |

FIG. 1I

| Cathode Current Collector | 101 |
|---|---|
| Cathode Energy Layer | 102 |
| Resistive Layer | 111 |
| Separator | 103 |
| Anode Energy Layer | 104 |
| Resistive Layer | 112 |
| Anode Current Collector | 105 |

FIG. 1J

Prior Art - Unshorted

Prior Art - Shorted

Unshorted

Shorted

Prior Art - Unshorted

Prior Art - Shorted

Unshorted

Shorted

Prior Art - Unshorted

Prior Art - Shorted

Unshorted

Shorted

| Cell # | Positive Electrode | Negative Electrode | Comments |
|---|---|---|---|
| 1 | POS1A:<br>$LiNi_{0.5}Mn_{0.3}Co_{0.2}O_2$: 93.4%;<br>Carbon black: 3%;<br>PVDF: 3.6%;<br>Loading: 15.55 mg/cm$^2$;<br>Thickness: v117μm. | NEG1A:<br>SLP 30: 18.272%;<br>MCMB: 75.728%;<br>Carbon black: 2%;<br>CMC: 1.5%;<br>SBR: 2.5%;<br>Loading: 9.14 mg/cm$^2$;<br>Thickness: 117 μm. | Baseline; no protection layer |
| 2 | POS2A:<br>$Li_{1+x}Ni_{0.33}Co_{0.33}Mn_{0.33}O_2$: 95.3%<br>Carbon black: 1.5%;<br>PVDF: 3%;<br>Dispersing agent: 0.2%;<br>Loading: 15.92 mg/cm$^2$;<br>Thickness: 123 μm. | NEG2A:<br>SLP 30: 18.872%;<br>MCMB: 75.728%;<br>Carbon black: 2%;<br>CMC: 1.3%;<br>SBR: 2.1%;<br>Loading: 8.54 mg/cm$^2$;<br>Thickness: 118 μm. | Baseline; no protection layer; resistance measurement for positive POS2A at 3.6V vs graphite |
| 3 | POS3B: 1$^{st}$ layer<br>$Al_2O_3$: 85.2%;<br>Carbon black: 0.8%;<br>TF-4000: 2%;<br>PVDF: 12%;<br>1$^{st}$ Layer Loading: 1 mg/cm$^2$;<br>1$^{st}$ Layer Thickness: ~10 μm.<br><br>POS3A: 2$^{nd}$ layer<br>$LiNi_{0.33}Mn_{0.33}Co_{0.33}O_2$ 93.4%;<br>Carbon black: 3%;<br>PVDF: 3.6%.<br><br>Total electrode (two layers):<br>Loading: 19.4 mg/cm$^2$;<br>Thickness: ~153 μm. | NEG3A:<br>SLP 30: 18.872%;<br>MCMB: 75.728%;<br>Carbon black: 2%;<br>CMC: 1.3%;<br>SBR: 2.1%;<br>Loading: 11.8 mg/cm$^2$;<br>Thickness: 159 μm. | Resistance layer coated on positive electrode. |
| 4 | POS4B: 1$^{st}$ layer<br>$BaTiO_2$: 50%;<br>Carbon black: 3.5%;<br>Polyacylic latex: 45.75%;<br>CMC: 0.75%;<br>1$^{st}$ Layer Loading: 0.7 mg/cm$^2$;<br>1$^{st}$ Layer Thickness: 10 μm.<br><br>POS4A: 2$^{nd}$ layer<br>$LiNi_{0.5}Mn_{0.3}Co_{0.2}O_2$: 93.4%;<br>Carbon black: 3%;<br>PVDF: 3.6%.<br><br>Total electrode (two layers):<br>Loading: 15.16 mg/cm$^2$;<br>Thickness: ~113 μm. | NEG4A:<br>SLP 30: 18.872%;<br>MCMB: 75.728%;<br>Carbon black: 2%;<br>CMC: 1.3%;<br>SBR: 2.1%;<br>Loading: 8.99 mg/cm$^2$;<br>Thickness: ~123 μm. | Resistance layer coated on positive electrode. |

FIG. 7A

| 5 | POS5A:<br>$LiNi_{0.33}Mn_{0.33}Co_{0.33}O_2$: 95%;<br>Carbon black: 1.5%;<br>PVDF: 3.5%;<br>Loading: 14.84 mg/cm$^2$;<br>Thickness: 113 μm. | NEG5B: 1$^{st}$ layer<br>Carbon black: 3.5%;<br>SBR: 45.75%;<br>BaTiO$_2$: 50%;<br>CMC: 1.1%;<br>1$^{st}$ Layer Loading: 1 mg/cm$^2$;<br>1$^{st}$ Layer Thickness: 10 μm.<br><br>NEG5A: 2$^{nd}$ layer<br>SLP 30: 18.872%;<br>MCMB: 75.728%;<br>Carbon black: 2%;<br>CMC: 1.3%;<br>SBR: 2.1%;<br>2$^{nd}$ Layer Loading: 9.8 mg/cm$^2$;<br>2$^{nd}$ Layer Thickness: 114 μm. | Resistance layer coated on negative electrode. |
|---|---|---|---|
| 6 | POS6B: 1$^{st}$ layer<br>Al$_2$O$_3$: 42.6%;<br>NaSiO$_3$: 42.6%;<br>Carbon black: 0.8%;<br>TF-4000: 2%;<br>PVDF: 12%;<br>1$^{st}$ Layer Loading: 0.7 mg/cm$^2$;<br>1$^{st}$ Layer Thickness: ~10 μm.<br><br>POS6A: 2$^{nd}$ layer<br>$LiNi_{0.33}Mn_{0.33}Co_{0.33}O_2$: 93.%;<br>Carbon black: 3%;<br>PVDF: 4%.<br><br>Total electrode (two layers):<br>Loading: 19.5 mg/cm$^2$;<br>Thickness: ~150 μm. | NEG6A:<br>SLP 30: 18.872%;<br>MCMB: 75.728%;<br>Carbon black: 2%;<br>CMC: 1.3%;<br>SBR: 2.1%;<br>Loading: 11.8 mg/cm$^2$;<br>Thickness: 159 μm. | Resistance layer (composed of two materials) coated on positive electrode. |

FIG. 7B

| Cell No. | Impedance (mohm) | Cap. At 1A (Ah) | Cap. At 3A (Ah) | Cap. At 6A (Ah) | Cap. At 10A (Ah) | Ratio (Cap. At 3A/Cap. At 1A) | Ratio (Cap. At 6A/Cap. At 1A) | Ratio (Cap. At 10A/Cap. At 1A) |
|---|---|---|---|---|---|---|---|---|
| 1 | 14 | 2.33 | 2.24 | 2.13 | 1.93 | 0.97 | 0.95 | 0.91 |
| 3 | 25.8 | 2.9117 | 2.8172 | 2.6473 | 2.3289 | 0.97 | 0.94 | 0.88 |
| 4 | 89 | 1.756 | 1.086 | 0.023 | 0 | 0.62 | 0.02 | 0 |
| 5 | 15.8 | 2.3383 | 2.2495 | 2.1446 | 1.967 | 0.96 | 0.95 | 0.92 |
| 6 | 16 | 2.416 | 2.379 | 2.3 | 2.06 | 0.98 | 0.97 | 0.9 |

FIG. 8

| Cell No. | Maximum Cell Temperature/°C | Comments |
|---|---|---|
| 1 | 334 | fire & explosion |
| 3 | 70 | pass |
| 4 | 90 | pass |
| 5 | 106 | pass |
| 6 | 90 | pass |

RECHARGEABLE BATTERY WITH RESISTIVE LAYER FOR ENHANCED SAFETY

CROSS-REFERENCE TO RELATED APPLICATIONS

This Application is a Continuation of application Ser. No. 16/003,953 filed Jun. 8, 2018, entitled "RECHARGEABLE BATTERY WITH RESISTIVE LAYER FOR ENHANCED SAFETY," which is a Continuation of application Ser. No. 14/952,754 filed on Nov. 25, 2015, now U.S. Pat. No. 10,020,545, entitled "RECHARGEABLE BATTERY WITH RESISTIVE LAYER FOR ENHANCED SAFETY," which claims the benefit of the following three (3) Provisional Applications: U.S. Provisional Application 62/114,508 filed on Feb. 10, 2015, entitled "RECHARGEABLE BATTERY WITH INTERNAL CURRENT LIMITER AND INTERRUPTER," U.S. Provisional Application 62/114,001 filed on Feb. 9, 2015, entitled "RECHARGEABLE BATTERY WITH RESISTIVE LAYER FOR ENHANCED SAFETY," and U.S. Provisional Application 62/084,454 filed on Nov. 25, 2014, entitled "BATTERY SAFETY DEVICE". The entire contents of these applications are incorporated herein by reference in their entirety.

BACKGROUND

Technical Field

This disclosure relates to an internal current limiter or current interrupter used to protect a battery in the event of an internal short circuit leads to thermal runaway. In particular, it relates to a high energy density rechargeable (HEDR) battery with improved safety.

Background

There is a need for rechargeable battery systems with enhanced safety that have a high energy density and hence are capable of storing and delivering large amounts of electrical energy per unit volume and/or weight. Such stable high-energy battery systems have significant utility in a number of applications including military equipment, communication equipment, and robotics.

An example of a high energy density rechargeable (HEDR) battery commonly in use is the lithium-ion battery.

A lithium-ion battery is a rechargeable battery wherein lithium ions move from the negative electrode to the positive electrode during discharge and back when charging. Lithium-ion batteries can be dangerous under some conditions and can pose a safety hazard. The fire energy content (electrical+chemical) of lithium cobalt-oxide cells is about 100 to 150 kJ/A-h (kilojoules per Amp-hour), most of it chemical. If overcharged or overheated, Li-ion batteries may suffer thermal runaway and cell rupture. In extreme cases this can lead to combustion. Also, short-circuiting the battery, either externally or internally, will cause the battery to overheat and possibly to catch fire.

Overcharge:

In a lithium-ion battery, useful work is performed when electrons flow through a closed external circuit. However, in order to maintain charge neutrality, for each electron that flows through the external circuit, there must be a corresponding lithium ion that is transported from one electrode to the other. The electric potential driving this transport is achieved by oxidizing a transition metal. For example, cobalt (Co), from $Co^{3+}$ to $Co^{4+}$ during charge and reduced from $Co^{4+}$ to $Co^{3+}$ during discharge. Conventionally, $Li_{1-\chi}CoO_2$ may be employed, where the coefficient $\chi$ represents the molar fraction of both the Li ion and the oxidative state of $CoO_2$, viz., $Co^{3+}$ or $Co^{4+}$. Employing these conventions, the positive electrode half-reaction for the lithium cobalt battery is represented as follows:

$$LiCoO_2 \leftrightarrow Li_{1-\chi}CoO_2 + \chi Li^+ + \chi e^-$$

The negative electrode half reaction is represented as follows:

$$\chi Li^+ + \chi e^- + \chi C_6 \leftrightarrow \chi LiC_6$$

The cobalt electrode reaction is reversible limited to $\chi<0.5$, limiting the depth of discharge allowable because of cycle life considerations and the stability of $LiCoO_2$. Overcharge leads to the synthesis of cobalt(IV) oxide, as follows:

$$LiCoO_2 \rightarrow Li^+ + CoO_2 + O_2 + e^+$$

$LiCoO_2$ will decompose into $CoO_2$ and release a large amount of heat and oxygen. The released oxygen will then oxidize the electrolyte, which will lead to thermal runaway. This process is irreversible. Therefore, what is needed is some device or design that can decompose below or before positive decomposition. This device will protect the cell from thermal runaway.

Thermal Runaway:

If the heat generated by a lithium ion battery exceeds its heat dissipation capacity, the battery can become susceptible to thermal runaway, resulting in overheating and, under some circumstances, to destructive results such as fire or violent explosion. Thermal runaway is a positive feedback loop wherein an increase in temperature changes the system so as to cause further increases in temperature. The excess heat can result from battery mismanagement, battery defect, accident, or other causes. However, the excess heat generation often results from increased joule heating due to excessive internal current or from exothermic reactions between the positive and negative electrodes. Excessive internal current can result from a variety of causes, but a lowering of the internal resistance due to separator short circuit is one possible cause. Heat resulting from a separator short circuit can cause a further breach within the separator, leading to a mixing of the reagents of the negative and positive electrodes and the generation of further heat due to the resultant exothermic reaction.

Internal Short Circuit:

Lithium ion batteries employ a separator between the negative and positive electrodes to electrically separate the two electrodes from one another while allowing lithium ions to pass through. When the battery performs work by passing electrons through an external circuit, the permeability of the separator to lithium ions enables the battery to close the circuit. Short circuiting the separator by providing a conductive path across it allows the battery to discharge rapidly. A short circuit across the separator can result from improper charging and discharging or cell manufacturing defects such as metal impurities and metal shard formation during electrode production. More particularly, improper charging can lead to the deposition of metallic lithium dendrites on the surface of the negative electrode and grow to penetrate the separator through the nanopores so as to provide a conductive path for electrons from one electrode to the other. In addition, improper discharge at or below 1.5V will cause copper dissolution that can lead to the formation of metallic copper dendrites on the surface of the negative electrode that can also grow to penetrate the separator through the nanopore. The lower resistance of the conductive path allows for rapid discharge and the generation of significant joule heat. Overheating and thermal runaway can result.

An internal current limiter could limit the rate of internal discharge resulting from an internal short circuit, including a short circuit of the separator, regardless of the temperature increase in a lithium ion battery.

SUMMARY

It is disclosed herein that a high energy density rechargeable (HEDR) battery may usefully incorporate an internal non-sacrificial current limiter to protect the battery in the event of an internal short circuit or overcharge. The current limiter is a resistive film of fixed resistance interposed between the electrode or separator and current collector. The fixed resistance of the resistive film remains stable when the battery is overheated.

A first aspect of the disclosure is directed to an improved high energy density rechargeable (HEDR) battery of a type including an anode energy layer, a cathode energy layer, a separator between the anode energy layer and the cathode energy layer for preventing internal discharge thereof, and at least one current collector for transferring electrons to and from either the anode or cathode energy layer. The anode and cathode energy layers each have an internal resistivity. The HEDR battery has a preferred temperature range for discharging electric current and an upper temperature safety limit. The improvement is employable, in the event of separator failure, for limiting the rate of internal discharge through the failed separator and the generation of joule heat resulting therefrom. More particularly, the improvement comprises a resistive layer interposed between the separator and one of the current collectors for limiting the rate of internal discharge through the failed separator in the event of separator failure. The resistive layer has a fixed resistivity at temperatures between the preferred temperature range and the upper temperature safety limit. The fixed resistivity of the resistive layer is greater than the internal resistivity of either energy layer. The resistive layer helps the battery avoid temperatures in excess of the upper temperature safety limit in the event of separator failure.

In a first aspect, provided herein is a high energy density rechargeable (HEDR) battery that includes an anode energy layer, a cathode energy layer, a separator between the anode energy layer and the cathode energy layer for preventing internal discharge thereof, at least one current collector for transferring electrons to and from either the anode or cathode energy layer, the anode and cathode energy layers each having an internal resistivity, the HEDR battery having a preferred temperature range for discharging electric current and an upper temperature safety limit; and a resistive layer interposed between the separator and one of the current collectors, the resistive layer configured to limit the rate of internal discharge through the separator in the event of separator failure and the generation of joule heat resulting therefrom, the resistive layer having a fixed resistivity at temperatures between the preferred temperature range and the upper temperature safety limit, the fixed resistivity of the resistive layer being greater than the internal resistivity of either energy layer, the resistive layer for avoiding temperatures in excess of the upper temperature safety limit in the event of separator failure.

The following features can be included in the HEDR battery in any suitable combination. In some implementations, the resistive layer of the HEDR battery can be porous and include a ceramic powder defining an interstitial space, a binder for partially filling the interstitial space for binding the ceramic powder; and a conductive component dispersed within the binder for imparting resistivity to the resistive layer, the interstitial space remaining partially unfilled for imparting porosity and permeability to the resistive layer. The resistive layer can be compressed to reduce the unfilled interstitial space and increase the binding of the ceramic powder by the binder. The resistive layer can include greater than 30% ceramic powder by weight. The resistive layer can include greater than 50% ceramic powder by weight. The resistive layer can include greater than 70% ceramic powder by weight. The resistive layer can include greater than 75% ceramic powder by weight. The resistive layer can include greater than 80% ceramic powder by weight. The resistive layer of the HEDR battery can be permeable to transport of ionic charge carriers. The resistive layer can be non-porous and have a composition that includes a non-conductive filler, a binder for binding the non-conductive filler, and a conductive component dispersed within the binder for imparting resistivity to the resistive layer. The resistive layer can be impermeable to transport of ionic charge carriers. The fixed resistivity of the resistive layer of the HEDR battery can be at least twice as great as the internal resistivity of either energy layer. The fixed resistivity of the resistive layer can be at least five times as great as the internal resistivity of either energy layer. The fixed resistivity of the resistive layer can be at least ten times as great as the internal resistivity of either energy layer. The resistive layer can lack a transformation from solid phase to non-solid phase for transforming the resistivity of the resistive layer from low resistivity to high resistivity at temperatures between the maximum operating temperature and the upper temperature safety limit. The resistive layer can be non-sacrificial at temperatures below the upper temperature safety limit. The resistive layer can be sacrificial at temperatures above the upper temperature safety limit. The resistive layer can include a ceramic powder that chemically decomposes above the upper temperature safety limit for evolving a fire retardant gas. The resistive layer can include a ceramic powder that chemically decomposes above the upper temperature safety limit for evolving a gas for delaminating the current collector from the resistive layer. The current collector can include an anode current collector for transferring electrons to and from the anode energy layer, wherein the resistive layer is interposed between the separator and the anode current collector. The resistive layer can be interposed between the anode current collector and the anode energy layer. The resistive layer can be interposed between the anode energy layer and the separator. In some implementations, the anode energy layer of the HEDR battery can include a first anode energy layer, and a second anode energy layer interposed between the first anode energy and the separator, wherein the resistive layer is interposed between the first anode energy layer and the second anode energy layer. The current collector can include a cathode current collector for transferring electrons to and from the cathode energy layer, wherein the resistive layer is interposed between the separator and the cathode current collector. The resistive layer can be interposed between the cathode current collector and the cathode energy layer. The resistive layer can be interposed between the cathode energy layer and the separator. The cathode energy layer can include a first cathode energy layer, and a second cathode energy layer interposed between the first cathode energy and the separator, wherein the resistive layer is interposed between the first cathode energy layer and the second cathode energy layer. In some implementations, the HEDR battery can include two current collectors that include an anode current collector for transferring electrons to and from the anode energy layer, and a cathode current collector for transferring electrons to and from the cathode energy layer in which the resistive layer comprises an anode resistive layer and a cathode resistive layer, the anode resistive layer interposed between the separator and the anode current collector, the cathode resistive layer interposed between the separator and the cathode current collector.

In a related aspect, provided herein is a method for limiting the rate of an internal discharge of energy layers resulting from a separator failure within a high energy density rechargeable (HEDR) battery, the method that includes resisting the internal discharge with a resistive layer, the resistive layer being interposed between a separator and a current collector within the HEDR battery, the resistive layer having a fixed resistivity at temperatures between a preferred temperature range for discharging the energy layers and an upper temperature safety limit, the fixed resistivity of the resistive layer being greater than the internal resistivity of the energy layers.

It is to be understood that both the foregoing general description and the following detailed description are exemplary and explanatory only and are not restrictive of the disclosure, as claimed.

BRIEF DESCRIPTION OF DRAWINGS

FIGS. 1A-1J illustrate schematic representations of exemplary configurations of film-type lithium ion batteries having one or more resistive layers serving as current limiters for protecting the battery against overheating in the event of an internal short circuit.

FIGS. 7A-7B illustrates exemplified Cell compositions described in the Examples below.

FIG. 8 illustrates the cell impedance and capacities at different currents for Cells 1, 3, 4, 5, and 6 described in the Examples below.

DETAILED DESCRIPTION

Figure 2A:
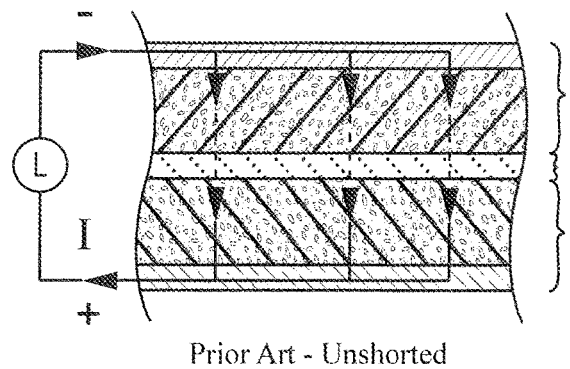
FIGS. 2A-2E illustrate cross sectional views of prior art film-type lithium ion batteries (FIGS. 2A and B) and of film-type lithium ion batteries with a resistance layer (FIGS. 2C and D).

Safe, long-term operation of high energy density rechargeable batteries, including lithium ion batteries, is a goal of battery manufacturers. One aspect of safe battery operation is controlling the discharge of these rechargeable batteries. As described above, a separator, or barrier layer, is used to separate the negative and positive electrodes in rechargeable batteries in which ions can move through the battery, but electrical current is forced to flow outside the battery, through an external circuit. Many factors may cause the separator to be breached, and may cause a short-circuit to occur within a rechargeable battery. A short-circuit leads to rapid discharge and possibly overheating and thermal runaway. Described below are apparatus and methods associated with an internal current limiter that limits the rate of internal discharge in a rechargeable battery when there is an internal short circuit.

Described herein is an improved high energy density rechargeable (HEDR) battery that includes an anode energy layer, a cathode energy layer, a separator between the anode energy layer and the cathode energy layer for preventing internal discharge thereof, and at least one current collector for transferring electrons to and from either the anode or cathode energy layer. The anode and cathode energy layers can each have an internal resistivity. The HEDR battery can have a preferred temperature range for discharging electric current and an upper temperature safety limit. In the event of separator failure, a resistive layer can be used for limiting the rate of internal discharge through the failed separator and the generation of joule heat resulting therefrom. The resistive layer can be interposed between the separator and one of the current collectors for limiting the rate of internal discharge through the failed separator in the event of separator failure. The resistive layer can have a fixed resistivity at temperatures between the preferred temperature range and the upper temperature safety limit. The fixed resistivity of the resistive layer can be greater than the internal resistivity of either energy layer. The resistive layer can help the battery avoid temperatures in excess of the upper temperature safety limit in the event of separator failure.

In some embodiments, the resistive layer can be porous or not porous and has a composition that includes a ceramic powder defining an interstitial space, a binder for partially filling the interstitial space for binding the ceramic powder, and a conductive component dispersed within the binder for imparting resistivity to the resistive layer. The interstitial space remains partially unfilled for imparting porosity and permeability to the resistive layer. The resistive layer can be compressed for reducing the unfilled interstitial space and increasing the binding of the ceramic powder by the binder. More particularly, the ceramic powder may have a weight percent of the resistive layer of about 30 to 99%; alternatively, the ceramic powder may have a weight percent of the resistive layer of about 50 to 90%; alternatively, the ceramic powder may have a weight percent of the resistive layer of about 60 to 80%. The resistive layer may be permeable to transport of ionic charge carriers.

In some embodiments, the resistive layer can be non-porous and can have a composition that includes a non-conductive filler, a binder for binding the non-conductive filler, and a conductive component dispersed within the binder for imparting resistivity to the resistive layer. The resistive layer may be impermeable to transport of ionic charge carriers.

In any of the embodiments of the battery, the fixed resistivity of the resistive layer may be at least twice as great as the internal resistivity of either energy layer; alternatively, the fixed resistivity of the resistive layer may be at least five times as great as the internal resistivity of either energy layer; alternatively, the fixed resistivity of the resistive layer may be at least ten times as great as the internal resistivity of either energy layer.

Furthermore, in any of the embodiments of the battery, the resistive layer may lack a physical phase transformation at temperatures between the preferred temperature range and the upper temperature safety limit for transforming the resistivity of the resistive layer. More particularly, the resistive layer may lack a transformation from solid phase to non-solid phase for transforming the resistivity of the resistive layer from low resistivity to high resistivity at temperatures between the maximum operating temperature and the upper temperature safety limit. The resistive layer may be non-sacrificial at temperatures below the upper temperature safety limit. However, the resistive layer may simultaneously be sacrificial at temperatures above the upper temperature safety limit.

In some embodiments of the battery, the HEDR battery can be of a type in which the current collector includes an anode current collector for transferring electrons to and from the anode energy layer. In these embodiments, the resistive layer may be interposed between the separator and the anode current collector. Alternatively, resistive layer may be interposed between the anode current collector and the anode energy layer or, the resistive layer may be interposed between the anode energy layer and the separator.

In some embodiments of the battery, the HEDR battery can be of a type in which the anode energy layer includes a first anode energy layer and a second anode energy layer interposed between the first anode energy and the separator. In such embodiments, the resistive layer may be interposed between the first anode energy layer and the second anode energy layer.

In some embodiments of the battery, the HEDR battery is of a type in which the current collector includes a cathode current collector for transferring electrons to and from the cathode energy layer. In these embodiments, the resistive layer may be interposed between the separator and the cathode current collector. Alternatively, resistive layer may be interposed between the cathode current collector and the cathode energy layer, or the resistive layer may be interposed between the cathode energy layer and the separator.

In some embodiments of the battery, the HEDR battery can be of a type in which the cathode energy layer includes a first cathode energy layer and a second cathode energy layer interposed between the first cathode energy and the separator. In these embodiments, the resistive layer may be interposed between the first cathode energy layer and the second cathode energy layer.

The HEDR battery can be of a type further having two current collectors including an anode current collector for transferring electrons to and from either the anode energy layer and/or a cathode current collector for transferring electrons to and from either the cathode energy layer. In some embodiments, the resistive layer can include an anode resistive layer and a cathode resistive layer. The anode resistive layer is interposed between the separator and the anode current collector. The cathode resistive layer is interposed between the separator and the cathode current collector.

A method for employing the current limiter (e.g. resistance layer) for limiting the rate of an internal discharge of energy layers resulting from a separator failure within a HEDR battery. The method comprises the step of resisting the internal discharge with a resistive layer. The resistive layer is interposed between a separator and a current collector within the HEDR battery. The resistive layer has a fixed resistivity at temperatures between a preferred temperature range for discharging the energy layers and an upper temperature safety limit. The fixed resistivity of the resistive layer is greater than the internal resistivity of the energy layers.

FIGS. 1A-1J illustrate schematic representations of exemplary configurations of film-type lithium ion batteries having one or more resistive layers serving as current limiters for protecting the battery against overheating in the event of an internal short circuit. FIGS. 1A, 1B, 1D, and 1E show configurations each with a cathode current collector 101, a cathode energy layer 102, a separator 103, one resistive layer 108, an anode energy layer 104, and an anode collector 105. FIG. 1C shows a configuration for a film-type lithium ion battery with a cathode current collector 101, a cathode energy layer 102, a separator 103, a resistive layer 108, a first anode energy layer 106, a second anode energy layer 107, and an anode collector 105. FIG. 1F shows a configuration for a film-type lithium ion battery with a cathode current collector 101, a first cathode energy layer 109, a second cathode energy layer 110, a separator 103, a resistive layer 108, an anode energy layer 104, and an anode collector 105. FIGS. 1G-1J show configurations each with a cathode current collector 101, a cathode energy layer 102, a separator 103, two resistive layers 111 and 112, an anode energy layer 104, and an anode collector 105.

Figure 2B:
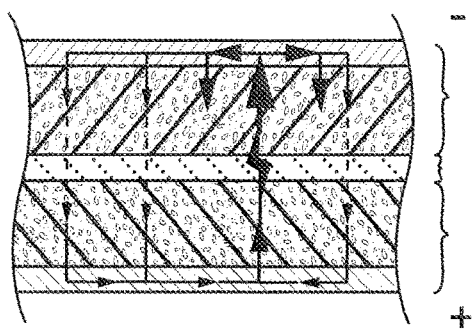
Figure 2C:
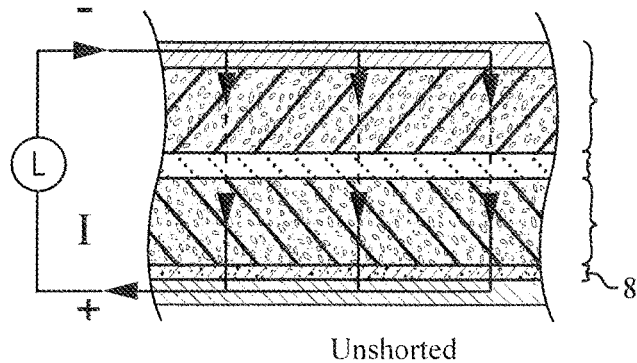
Figure 2D:
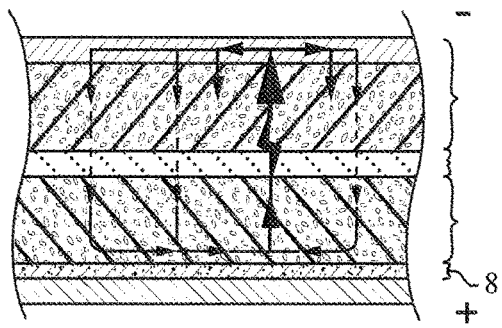
Figure 2E:
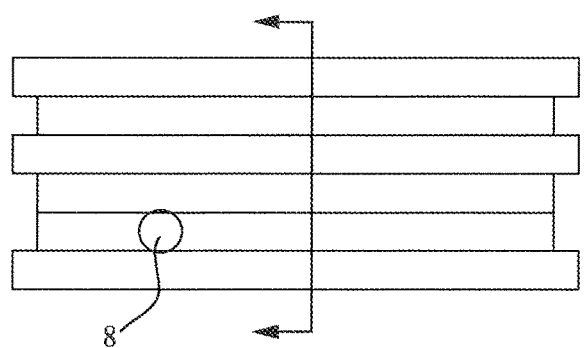

FIGS. 2A-2E illustrate cross sectional views of prior art film-type lithium ion batteries (FIGS. 2A and B) and of film-type lithium ion batteries with a resistance layer (FIGS. 2C and D). More particularly, FIGS. 2A-2E illustrate the current flow through film-type lithium ion batteries undergoing discharge for powering a load (L). FIGS. 2A and C illustrate the current flow of film-type lithium ion batteries having an intact fully operational separator (unshorted). FIGS. 2B and D illustrate the current flow of film-type lithium ion batteries having resistive layer serving as a current limiter, wherein the separator has been short circuited by a conductive dentrite penetrating there through. In FIGS. 2B and D, the cells are undergoing internal discharge. Note that devices with unshorted separators (FIGS. 2A and C) and the prior art device with the shorted separator (FIG. 2B), current flows from one current collector to the other. However, in the exemplary device, shown in FIG. 2E, having a shorted separator and resistive layer 8 (FIG. 2D), current flow is diverted from the current collector and is much reduced.

Figure 3A:
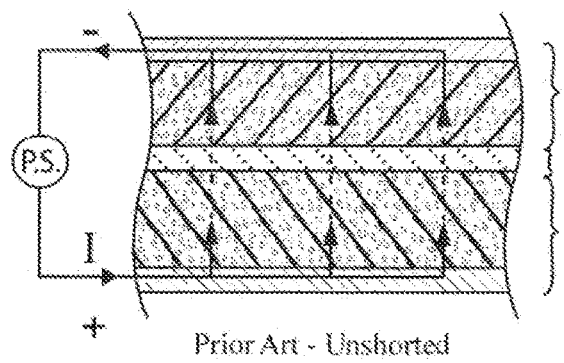
FIGS. 3A-3E illustrate cross sectional views of prior art film-type lithium ion batteries (FIGS. 3A and B) and of film-type lithium ion batteries of with a resistance layer (FIGS. 2C and D).
Figure 3B:
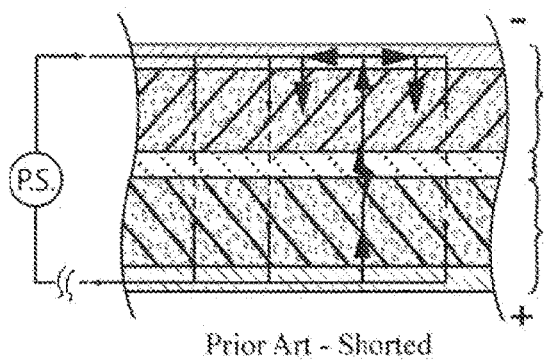
Figure 3C:
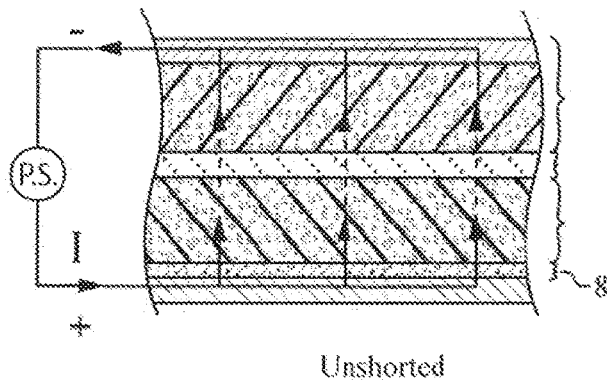
Figure 3D:
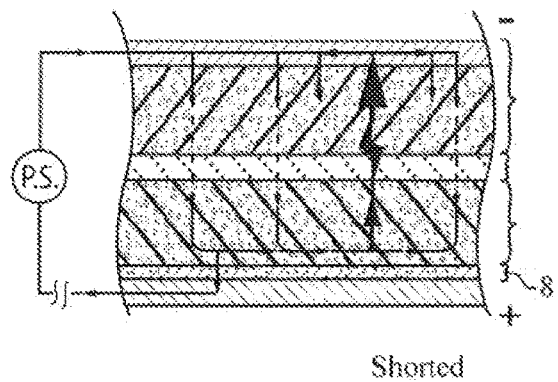
Figure 3E:
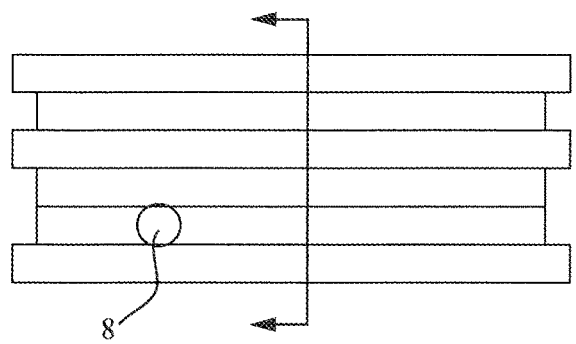

FIGS. 3A-3E illustrate cross sectional views of prior art film-type lithium ion batteries (FIGS. 3A and B) and of film-type lithium ion batteries of with a resistance layer (FIGS. 2C and D). More particularly, FIGS. 3A-3E illustrate the current flow through film-type lithium ion batteries while its being charged by a smart power supply (PS) that will stop the charging when it detects any abnormal voltage. FIGS. 3A and C illustrate the current flow of film-type lithium ion batteries having an intact fully operational separator (unshorted). FIGS. 3B and D illustrate the current flow of film-type lithium ion batteries having a having a separator shorted by a conductive dentrite. Note that devices with unshorted separators (FIGS. 3A and C) and the prior art device with the shorted separator (FIG. 3B), current flows from one current collector to the other. However, in the exemplary device, shown in FIG. 3E, having a shorted separator and resistive layer 8 (as shown in FIG. 3D), current flow is diverted from the current collector and is much reduced.

Figure 4A:
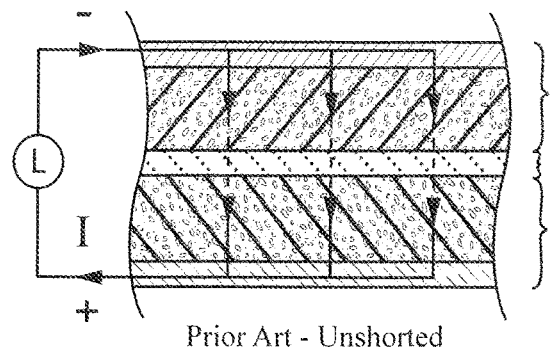
FIGS. 4A-4E illustrate cross sectional views of prior art film-type lithium ion batteries (FIGS. 4A and B) and of film-type lithium ion batteries with a resistance layer (FIGS. 4C and D).
Figure 4B:
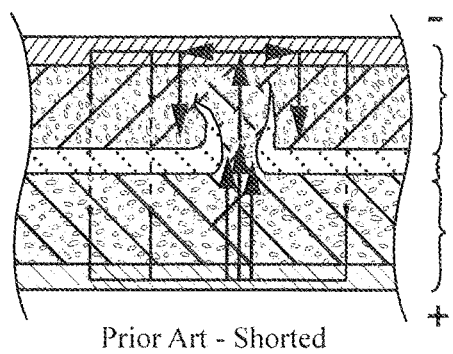
Figure 4C:
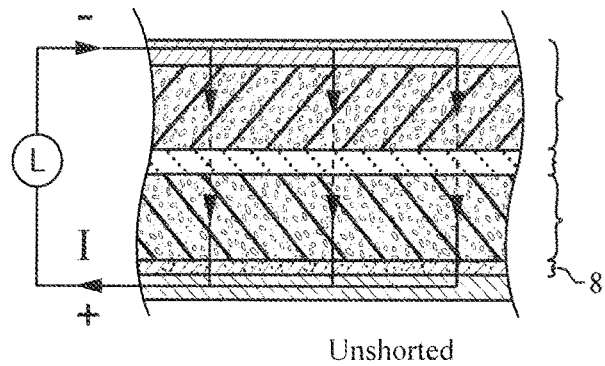
Figure 4D:
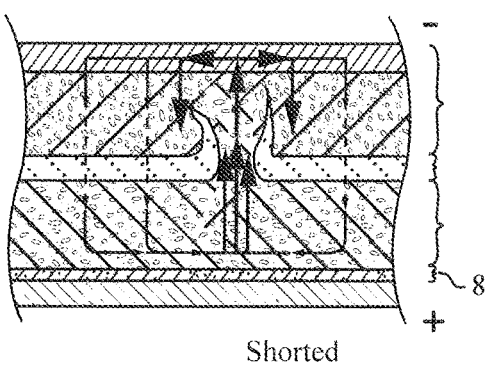
Figure 4E:
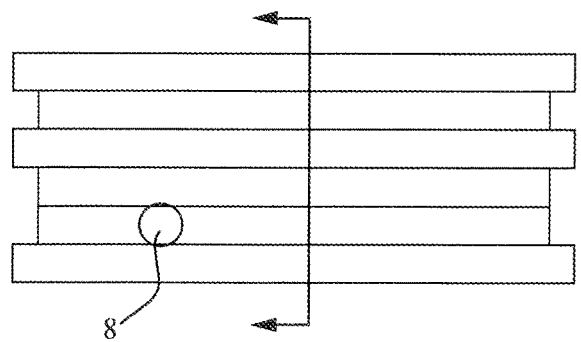

FIGS. 4A-4E illustrate cross sectional views of prior art film-type lithium ion batteries (FIGS. 4A and B) and of film-type lithium ion batteries with a resistance layer (FIGS. 4C and D). More particularly, FIGS. 4A-4E illustrate the current flow through film-type lithium ion batteries undergoing discharge for powering a load (L). FIGS. 4A and C illustrate the current flow of film-type lithium ion batteries having an intact fully operational separator (unshorted). FIGS. 4B and D illustrate the current flow of film-type lithium ion batteries having a short circuit caused by a disrupted separator. Note that devices with unshorted separators (FIGS. 4A and C) and the prior art device with the shorted separator (FIG. 4B), current flows from one current collector to the other. However, in the exemplary device, shown in FIG. 4E, having a shorted separator and resistive layer 8 (as shown in FIG. 4D), current flow is diverted from the current collector and is much reduced.

Figure 5A:
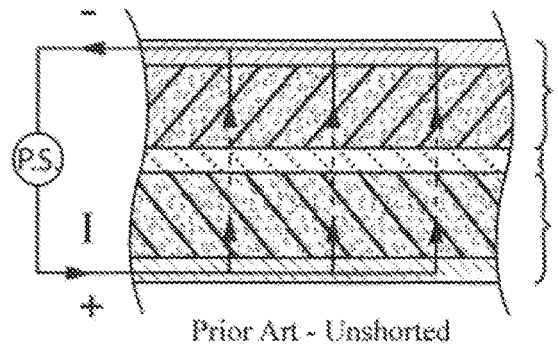
FIGS. 5A-5E illustrate cross sectional views of prior art film-type lithium ion batteries (FIGS. 5A and B) and of film-type lithium ion batteries with a resistance layer (FIGS. 5C and D).
Figure 5B:
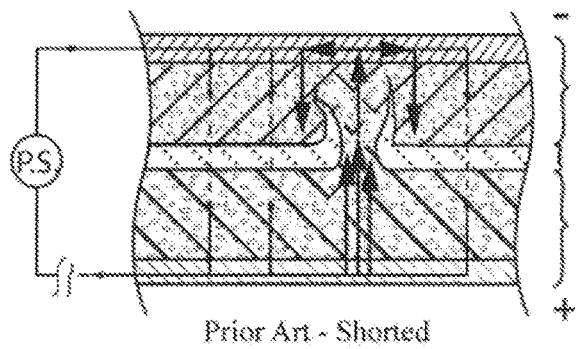
Figure 5C:
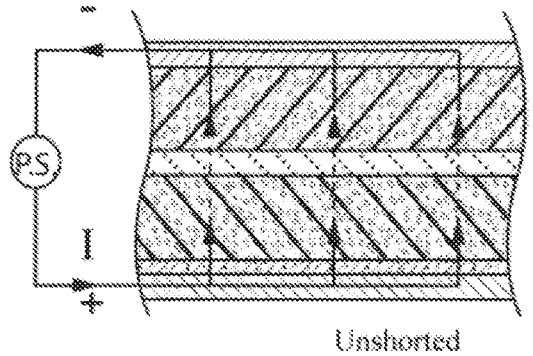
Figure 5D:
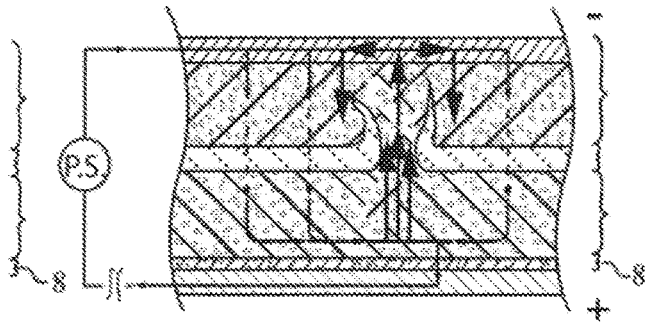
Figure 5E:
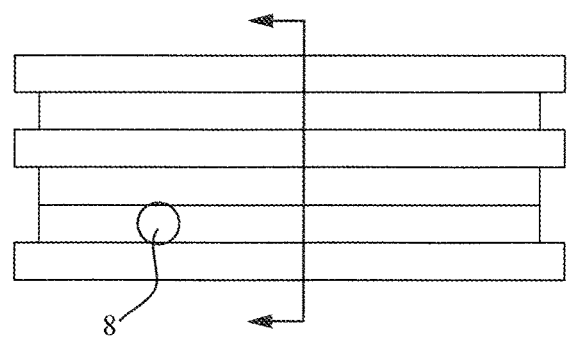

FIGS. 5A-5E illustrate cross sectional views of prior art film-type lithium ion batteries (FIGS. 5A and B) and of film-type lithium ion batteries with a resistance layer (FIGS. 5C and D). More particularly, FIGS. 5A-5E illustrate the current flow through film-type lithium ion batteries while its being charged by a smart power supply (PS) that will stop the charging when it detects any abnormal charging voltage. FIGS. 5A and C illustrate the current flow of film-type lithium ion batteries having an intact fully operational separator (unshorted). FIGS. 5B and D illustrate the current flow of film-type lithium ion batteries having a having a short circuit caused by a disrupted separator. Note that devices with unshorted separators (FIGS. 5A and C) and the prior art device with the shorted separator (FIG. 5B), current flows from one current collector to the other. However, in the exemplary device, shown in FIG. 5E, having a shorted separator and resistive layer 8 (as shown in FIG. 5D), current flow is diverted from the current collector and is much reduced.

Figure 6A:
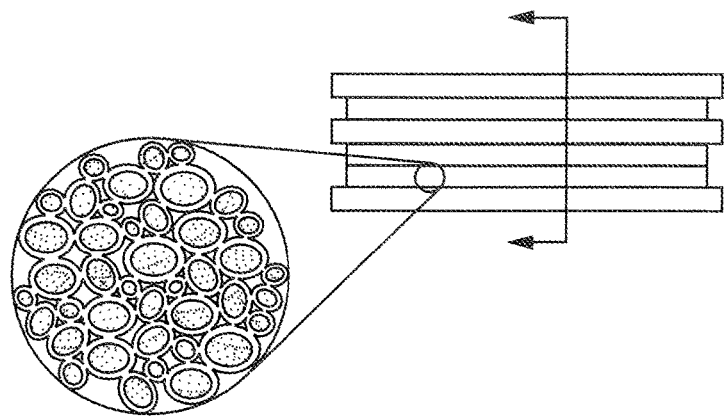
FIGS. 6A-6C illustrates exemplary structures for the resistive layer (8).
Figure 6B:
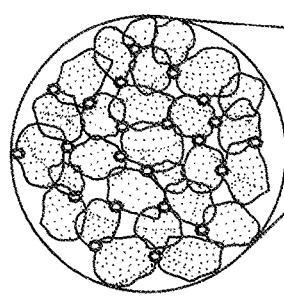
Figure 6C:
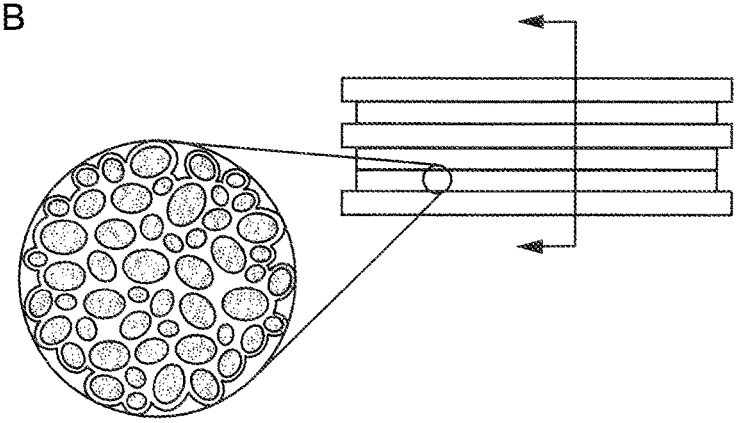

FIG. 6 illustrates exemplary structures for the resistive layer (8). FIG. 6A illustrates resistive layer having a high proportion of ceramic particles (80% or more) coated with binder. Interstitial voids between the coated ceramic particles render the resistive layer porous. FIG. 6B illustrates resistive layer having a high proportion of ceramic particles (80% or more) bound together by particles of binder. Interstitial voids between the coated ceramic particles render the resistive layer porous. FIG. 6C illustrates resistive layer having an intermediate proportion of ceramic particles (less than 80%) held together with binder. The resistive layer lacks interstitial voids between the coated ceramic particles and is non-porous.

The following abbreviations have the indicated meanings in this disclosure:
CMC=carboxymethyl cellulose
MCMB=mesocarbon microbeads
NMC=Nickel, Manganese and Cobalt
NMP=N-methylpyrrolidone
PTC=positive temperature coefficient
PVDF=polyvinylidene fluoride
SBR=styrene butadiene rubber
Torlon® 4000TF=neat resin polyamide-imide (PAI) fine powder Preparation of the resistance layer and electrode active layer is described below, along with battery cell assembly.

The following is a generalized procedure for preparing a resistance layer.
  i. Dissolve the binder into an appropriate solvent.
  ii. Add the conductive additive and ceramic powder into the binder solution to form a slurry.
  iii. Coat the slurry made in Step ii. onto the surface of a metal foil, and then dry it to form a resistance layer on the surface of the foil.

The following is a generalized procedure for the electrode preparation (on the top of the first layer).
  iv. Dissolve the binder into an appropriate solvent.
  v. Add the conductive additive into the binder solution to form a slurry.
  vi. Put the cathode or anode material into the slurry made in the Step v. and mix it to form the slurry for the electrode coating.
  vii. Coat the electrode slurry made in the Step vi. onto the surface of the layer from
Step iii.
  viii. Compress the electrode into the design thickness.

The following is a generalized procedure for Cell assembly.
  ix. Dry the positive electrode at 125° C. for 10 hours and negative electrode at 140° C. for 10 hours.
  x. Punch the electrodes into the pieces with the electrode tab.
  xi. Laminate the positive and negative electrodes with the separator as the middle layer.
  xii. Put the flat jelly-roll made in the Step xi. into an aluminum composite bag.

Figure 13:
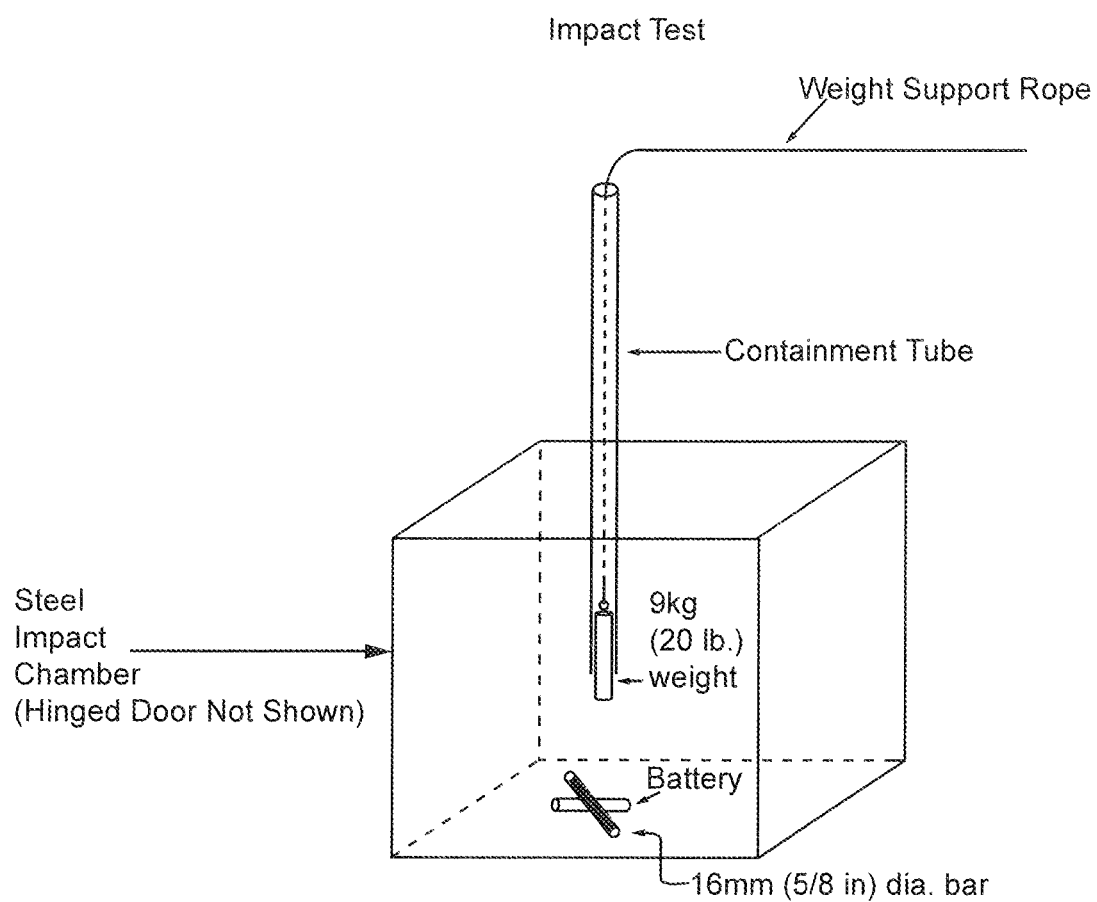
FIG. 13 illustrates the Impact Test design.

Below are the generalized steps for conducting an impact test, as shown in FIG. 13, for a battery cell with a resistance layer.
  i. Charge the cell at 2 A and 4.2V for 3 hours.
  ii. Put the cell onto a hard flat surface such as concrete.
  iii. Attach a thermal couple to the surface of the cell with high temperature tape and connect the positive and negative tabs to the voltage meter.

iv. Place a steel rod (15.8 mm±0.1 mm in diameter by about 70 mm long) on its side across the center of the cell.
v. Suspend a 9.1±0.46 Kg steel block (75 mm in diameter by 290 mm high) at a height of 610±25 mm above the cell.
vi. Using a containment tube (8 cm inside diameter) to guide the steel block, release the steel block through the tube and allow it to free fall onto the steel bar laying on the surface of the cell causing the separator to breach while recording the temperature.
vii. Leave the steel rod and steel block on the surface of the cell until the cell temperature stabilizes near room temperature.
viii. End test.

Below are the generalized steps for testing a battery cell with a resistance layer for cycle life.
i. Rest for 5 minutes.
ii. Discharge to 2.8V.
iii. Rest for 20 minutes.
iv. Charge to 4.2V at 0.7 A for 270 minutes.
v. Rest for 10 minutes.
vi. Discharge to 2.8V at 0.7 A.
vii. Rest for 10 minutes.
viii. Repeat Steps iii to vii 100 times.
ix. End test.

The overcharge test generally follows the protocol below.
i. Charge the cell at 2 A and 4.2V for 3 hours.
ii. Put the charged cell into a room temperature oven.
iii. Connect the cell to a power supply (manufactured by Hewlett-Packard).
iv. Set the voltage and current on the power supply to 12V and 2 A.
v. Turn on the power supply to start the overcharge test while recording the temperature and voltage.
vi. Test ends when the cell temperature decreases and stabilizes near room temperature.

Resistance Measurement Test protocol is as follows.
i. Place one squared copper foil (4.2×2.8 cm) with the tab on to a metal plate (~12×~8 cm). Then cut a piece of thermal tape and carefully cover one side of the squared copper foil.
ii. Cut a piece of the electrode that is slightly larger than the copper paper. Place the electrode on to the copper foil.
iii. Place another copper foil (4.2×2.8 cm) with tab on the electrode surface, repeat steps i-ii with it.
iv. At this point, carefully put them together and cover them using high temperature tape and get rid of any air bubble
v. Cut a "V" shaped piece of metal off both tabs.
vi. Attach the completed strip to the metal clamp and tighten the screws. Make sure the screws are really tight.
vii. Attach the tabs to the connectors of Battery HiTester (produced by Hioki USA Corp.) to measure the resistance to make sure that a good sample has been made for the measurement.
viii. Put the metal clamp inside the oven, connect the "V" shaped tabs to the connectors and then tightened the screw. Tape the thermal couple onto the metal clamp.
ix. Attach the Battery HiTester to the wires from oven. Do not mix up the positive and the negative wires.
x. Close the oven and set the temperature to 200° C. at 4° C. per minute, and start the test. Record data every 15 seconds.
xi. Stop recording the data when the metal clamp and oven reach just a little over 200° C.
xii. Turn off the oven and the Battery HiTester.
xiii. End Test.

The Cycle Life procedure includes the following.
i. Rest for 5 minutes.
ii. Discharge to 2.8V.
iii. Rest for 20 minutes.
iv. Charge to 4.2V at 0.7 A for 270 minutes.
v. Rest for 10 minutes.
vi. Discharge to 2.8V at 0.7 A.
vii. Rest for 10 minutes.
viii. Repeat Steps iii to vii 100 times.
i. End test.

Below are the generalized steps for testing a battery cell with a resistance layer for discharge at 1 A, 3 A, 6 A, and 10 A. In each test, the battery cell is tested in a chamber with controlled, constant temperature, for example 50° C.
i. Rest for 5 minutes.
ii. Discharge to 2.8V.
iii. Rest for 20 minutes.
iv. Charge to 4.2V at 0.7 A for 270 minutes.
v. Rest for 10 minutes.
vi. Discharge to 2.8V at 1 A.
vii. Rest for 10 minutes.
viii. Charge to 4.2V at 0.7 A for 270 minutes.
ix. Rest for 10 minutes.
x. Discharge to 2.8V at 3 A.
xi. Charge to 4.2V at 0.7 A for 270 minutes.
xii. Rest for 10 minutes.
xiii. Discharge to 2.8V at 6 A.
xiv. Charge to 4.2V at 0.7 A for 270 minutes.
xv. Rest for 10 minutes.
xvi. Discharge to 2.8V at 10 A.
xvii. Rest for 10 minutes.
xviii. End Test.

As used herein, "high energy density rechargeable (HEDR) battery" means a battery capable of storing relatively large amounts of electrical energy per unit weight on the order of about 50 W-hr/kg or greater and is designed for reuse, and is capable of being recharged after repeated uses. Non-limiting examples of HEDR batteries include metal-ion batteries and metallic batteries.

As used herein, "metal-ion batteries" means any rechargeable battery types in which metal ions move from the negative electrode to the positive electrode during discharge and back when charging. Non-limiting examples of metal-ion batteries include lithium-ion, aluminum-ion, potassium-ion, sodium-ion, magnesium-ion, and the like.

As used herein, "metallic batteries" means any rechargeable battery types in which the anode is a metal or metal alloy. The anode can be solid or liquid. Metal ions move from the negative electrode to the positive electrode during discharge and back when charging. Non-limiting examples of metallic batteries include M-S, M-NiCl$_2$, M-V$_2$O$_5$, M-Ag$_2$VP$_2$O$_8$, M-TiS$_2$, M-TiO$_2$, M-MnO$_2$, M-Mo$_3$S$_4$, M-MOS$_6$Se$_2$, M-MoS$_2$, M-MgCoSiO$_4$, M-Mg$_{1.03}$Mn$_{0.97}$SiO$_4$, and others, where M=Li, Na, K, Mg, Al, or Zn.

As used herein, "lithium-ion battery" means any rechargeable battery types in which lithium ions move from the negative electrode to the positive electrode during discharge and back when charging. Non-limiting examples of lithium-ion batteries include lithium cobalt oxide (LiCoO$_2$), lithium iron phosphate (LiFePO$_4$), lithium manganese oxide (LiMn$_2$O$_4$), lithium nickel oxide (LiNiO$_2$), lithium nickel manganese cobalt oxide (LiNiMnCoO$_2$), lithium nickel cobalt aluminum oxide (LiNiCoAlO$_2$), lithium titanate (Li$_4$Ti$_5$O$_{12}$), lithium titanium dioxide, lithium/graphene, lithium/graphene oxide coated sulfur, lithium—sulfur, lithium-purpurin, and others. Lithium-ion batteries can also come with a variety of anodes including silicon-carbon nanocomposite anodes and the like. Lithium-ion batteries can be in various shapes including small cylindrical (solid body without terminals), large cylindrical (solid body with large threaded terminals), prismatic (semi-hard plastic case with large threaded terminals), and pouch (soft, flat body). Lithium polymer batteries can be in a soft package or pouch. The electrolytes in these batteries can be a liquid electrolyte (such as carbonate based or ionic), a solid electrolyte, a polymer based electrolyte or a mixture of these electrolytes.

As used herein, "aluminum-ion battery" means any rechargeable battery types in which aluminum ions move from the negative electrode to the positive electrode during discharge and back when charging. Non-limiting examples of aluminum-ion batteries include A$_n$M$_2$(XO$_4$)$_3$, wherein X=Si, P, S, Mo, As, and others; and M=Fe, Ca, Mg, V, Cr and the like; aluminum transition-metal oxides (Al$_x$MO$_2$ wherein M=Fe, Mn, Ni, Mo, Co, Cr, Ti, V and others) such as Al$_x$(V$_4$O$_8$), Al$_x$NiS$_2$, Al$_x$FeS$_2$, Al$_x$VS$_2$ and Al$_x$WS$_2$ and the like.

As used herein, "potassium-ion battery" means any rechargeable battery types in which potassium ions move from the negative electrode to the positive electrode during discharge and back when charging. Non-limiting examples of potassium-ion batteries include K$_n$M$_2$(XO$_4$)$_3$, wherein X=Si, P, S, Mo, As, and others; and M=Fe, Ca, Mg, V, Cr and others; potassium transition-metal oxides (KMO$_2$ wherein M=Fe, Mn, Ni, Mo, Co, Cr, Ti, V and others), and the like.

As used herein, "sodium-ion battery" means any rechargeable battery types in which sodium ions move from the negative electrode to the positive electrode during discharge and back when charging. Non-limiting examples of sodium-ion batteries include Na$_n$M$_2$(XO$_4$)$_3$, wherein X=Si, P, S, Mo, As, and others; and M=Fe, Ca, Mg, V, Cr and others; NaV$_{1-x}$Cr$_x$PO$_4$F, NaVPO$_4$F, Na$_4$Fe$_3$(PO$_4$)$_2$(P$_2$O$_7$), Na$_2$FePO$_4$F, Na$_2$FeP$_2$O$_7$, Na$_{2/3}$[Fe$_{1/2}$Mn$_{1/2}$]O$_2$, Na(Ni$_{1/3}$Fe$_{1/3}$Mn$_{1/3}$)O$_2$, NaTiS$_2$, NaFeF$_3$; sodium transition-metal oxides (NaMO$_2$ wherein M=Fe, Mn, Ni, Mo, Co, Cr, Ti, V and others) such as Na$_{2/3}$[Fe$_{1/2}$Mn$_{2/3}$]O$_2$, Na(Ni$_{1/3}$Fe$_{1/3}$Mn$_{1/3}$)O$_2$, Na$_x$Mo$_2$O$_4$, NaFeO$_2$, Na$_{0.7}$CoO$_2$, NaCrO$_2$, NaMnO$_2$, Na$_{0.44}$MnO$_2$, Na$_{0.7}$MnO$_2$, Na$_{0.7}$MnO$_{2.25}$, Na$_{2/3}$Mn$_{2/3}$Ni$_{1/3}$O$_2$, Na$_{0.61}$Ti$_{0.48}$Mn$_{0.52}$O$_2$; vanadium oxides such as Na$_{1+x}$V$_3$O$_8$, Na$_x$V$_2$O$_5$, and Na$_x$VO$_2$ (x=0.7, 1); and the like.

As used herein, "magnesium-ion battery" means any rechargeable battery types in which magnesium ions move from the negative electrode to the positive electrode during discharge and back when charging. Non-limiting examples of magnesium-ion batteries include Mg$_n$M$_2$(XO$_4$)$_3$, wherein X=Si, P, S, Mo, As, and others; and M=Fe, Ca, Mg, V, Cr and others; magnesium transition-metal oxides (MgMO$_2$ wherein M=Fe, Mn, Ni, Mo, Co, Cr, Ti, V and others), and the like.

As used herein, "binder" means any material that provides mechanical adhesion and ductility with inexhaustible tolerance of large volume change. Non-limiting examples of binders include styrene butadiene rubber (SBR)-based binders, polyvinylidene fluoride (PVDF)-based binders, carboxymethyl cellulose (CMC)-based binders, poly(acrylic acid) (PAA)-based binders, polyvinyl acids (PVA)-based binders, poly(vinylpyrrolidone) (PVP)-based binders, poly carbonate, and poly ethylene oxide and the like.

As used herein, "conductive additive" means any substance that increases the conductivity of the material. Non-limiting examples of conductive additives include carbon black additives, graphite non-aqueous ultrafine carbon (UFC) suspensions, carbon nanotube composite (CNT) additives (single and multi-wall), carbon nano-onion (CNO) additives, graphene-based additives, reduced graphene oxide (rGO), conductive acetylene black (AB), conductive poly(3-methylthiophene) (PMT), filamentary nickel powder additives, aluminum powder, some electrochemically active oxides such as lithium nickel cobalt manages oxide, and the like.

As used herein, "metal foil" means any metal foil that under high voltage is stable. Non-limiting examples of metal foils include aluminum foil, copper foil, titanium foil, steel foil, nano-carbon paper, graphene paper, carbon fiber sheet, and the like.

As used herein, "ceramic powder" means any electrical insulator or electrical conductor that has not been fired into a sintered, solid body. Non-limiting examples of ceramic powder materials include barium titanate (BaTiO$_3$), zirconium barium titanate, strontium titanate (SrTiO$_3$), calcium titanate (CaTiO$_3$), magnesium titanate (MgTiO$_3$), calcium magnesium titanate, zinc titanate (ZnTiO$_3$), lanthanum titanate (LaTiO$_3$), and neodymium titanate (Nd$_2$Ti$_2$O$_7$), barium zirconate (BaZrO$_3$), calcium zirconate (CaZrO$_3$), lead magnesium niobate, lead zinc niobate, lithium niobate (LiNbO$_3$), barium stannate (BaSnO$_3$), calcium stannate (CaSnO$_3$), magnesium aluminum silicate, sodium silicate (NaSiO$_3$), magnesium silicate (MgSiO$_3$), barium tantalate (BaTa$_2$O$_6$), niobium oxide, zirconium tin titanate, and the like.

In some embodiments, layers can be coated onto metal foils by an automatic coating machine (e.g. a compact coater, such as model number 3R250 W-2D produced by Thank-Metal Co., Ltd.). Layers can then be compressed to the desired thickness using a machine with rollers, for example a calendar machine (e.g., model number X15-300-1-DZ produced by Beijing Sevenstar Huachuang Electronics Co., Ltd.).

EXAMPLES

The high energy density rechargeable (HEDR) battery with a resistive layer is described more in detail below using examples, but the battery, battery cell, or methods of making or using the battery are not limited to the examples below.

Example 1

Preparation of baseline, positive and negative electrodes, and the completed Cell 1 for the evaluation in the resistance measurement, discharge capability tests at 50° C., impact test, and cycle life test are described below.

A) Preparation of POS1 A as an example of the positive electrode preparation.

i) PVDF (21.6 g) was dissolved into NMP (250 g); ii) Carbon black (18 g) was added and mixed for 15 min at 6500 rpm; iii) LiNi$_{0.5}$Mn$_{0.3}$Co$_{0.2}$O$_2$ (NMC) (560.4 g) was added to the slurry from Step ii and mixed for 30 min at 6500 rpm to form a flowable slurry; iv) Some NMP was added for the viscosity adjustment; v) This slurry was coated onto 15 μm aluminum foil using an automatic coating machine with the first heat zone set to about 80° C. and the second heat zone to about 130° C. to evaporate off the NMP. The final dried solid loading was about 15.55 mg/cm$^2$. The positive layer was then compressed to a thickness of about 117 μm. This electrode was designated as zero voltage against a standard graphite electrode and was used for the impedance measurement at 0 V in relation to the temperature, and was used for the dry portion of the cell assembly.

B) Preparation of NEG2 A as an Example of the Negative Electrode Preparation i) CMC (5.2 g) was dissolved into deionized water (~300 g); ii) Carbon black was added (8.4 g) and mixed for 15 min at 6500 rpm; iii) Negative active graphite (JFE Chemical Corporation; Graphitized Mesophase Carbon Micro Bead (MCMB) and Synthetic Graphite (TIMCAL), 378.4 g in total, was added to the slurry from Step ii and mixed for 30 min at 6500 rpm to form a flowable slurry; iv) SBR (solid content 50% suspended in water) (16.8 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 70° C. and the second heat zone to about 100° C. to evaporate off the water. The final dried solid loading was about 9.14 mg/cm$^2$. The negative electrode layer was then compressed to a thickness of about 117 This negative electrode was used for the dry for the cell assembly.

C) Preparation of Cell for the Evaluation i) The electrodes were punched into the pieces with an electrode tab; ii) The positive electrode was dried at 125° C. for 10 hours and the negative electrode at 140° C. for 10 hours; iii) The positive and negative electrodes were laminated with the separator as the middle layer; iv) The flat jelly-roll made in the Step iii. was laid flat into an aluminum composite bag; v) The bag from Step iv. was dried in a 70° C. vacuum oven; vi) The bag from Step v was filled with the LiPF$_6$ containing organic carbonate based electrolyte; vii) The bag from Step vi was sealed; viii) Rested for 16 hours; ix) The cell was charged to 4.2V at C/20 rate for 5 hours and then to 4.2V at 0.5 C rate for 2 hours, then rested for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

Figure 9:
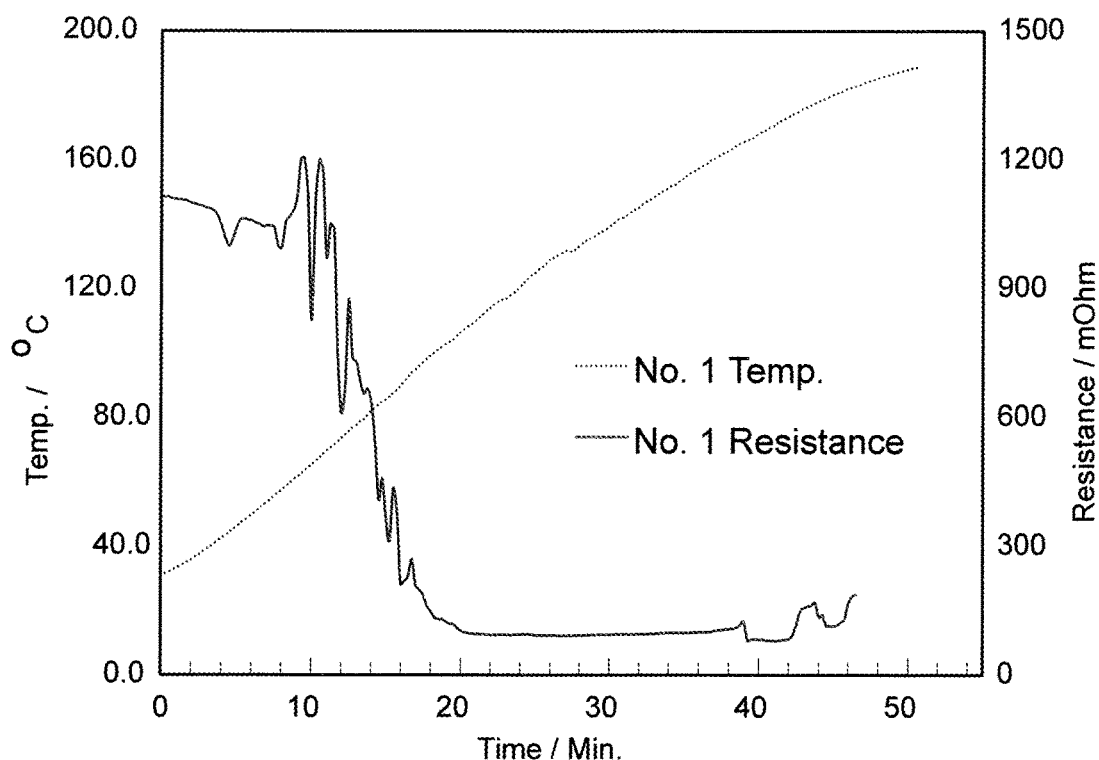
FIG. 9 illustrates the resistance of Cell 2 (baseline, no any resistive layer) at 3.6V vs graphite in relation to the temperature increase. The resistance decreased about 10 times with the increase in the temperature.
Figure 11:
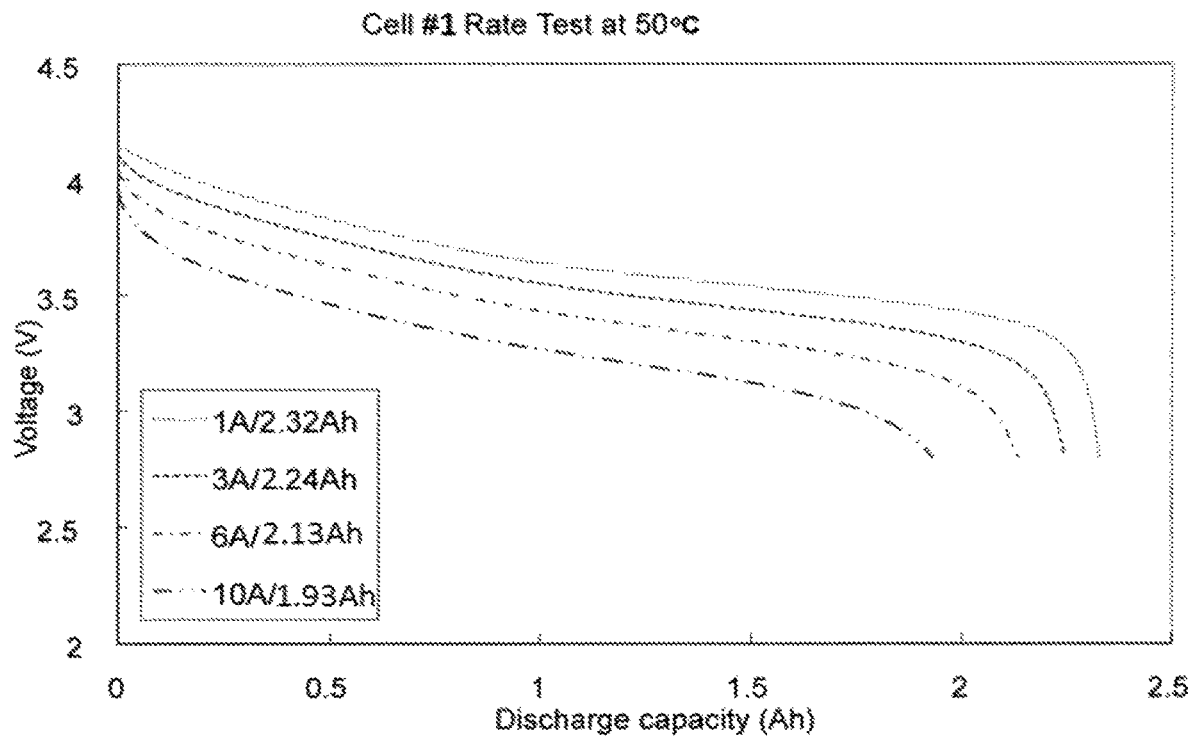
FIG. 11 illustrates the discharge capacity of Cell 1 (baseline, no any resistive layer) vs the cell voltage at the currents of 1 A, 3 A, 6 A and 10 A.
Figures 14, 15:
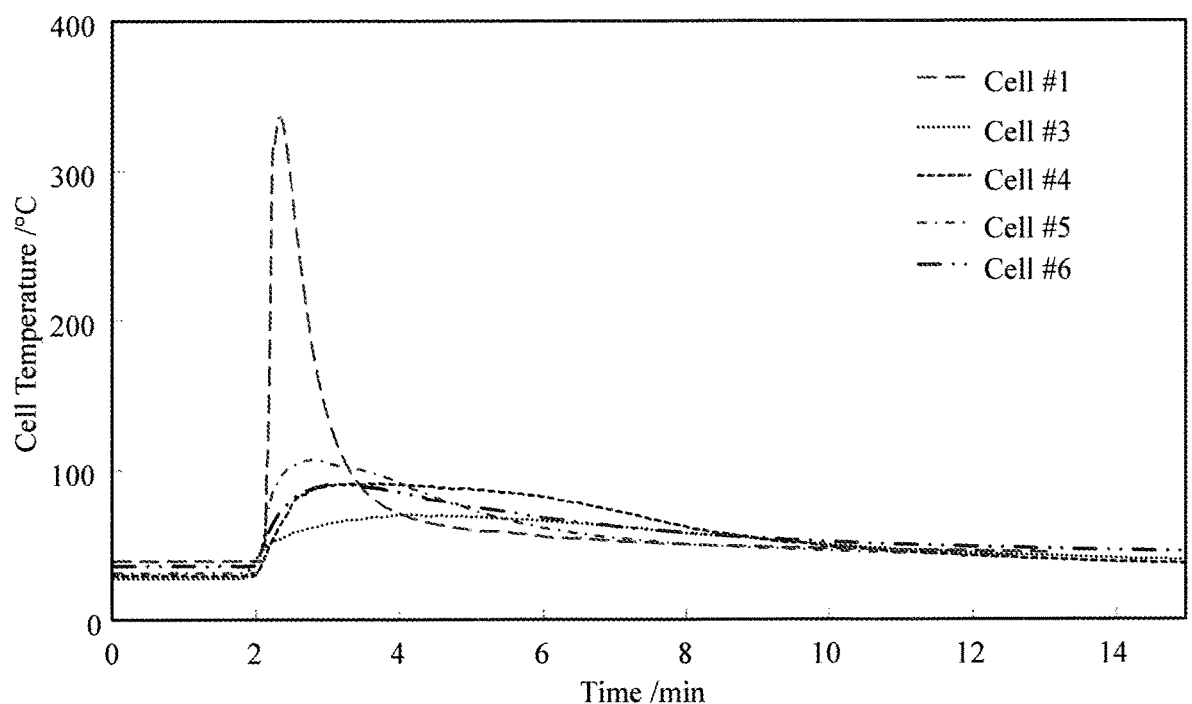
FIG. 14 illustrates the Cell temperature profiles during the impact test for Cells 1, 3, 4, 5, and 6. All cells with the resistive layer passed the test while the cell without any resistive layer failed in the test (caught on fire). The maximum cell temperature during the impact test is summarized in FIG. 15.
FIG. 15 illustrates the maximum temperature obtained by Cells 1, 3, 4, 5, and 6 during the impact test.
Figure 16:
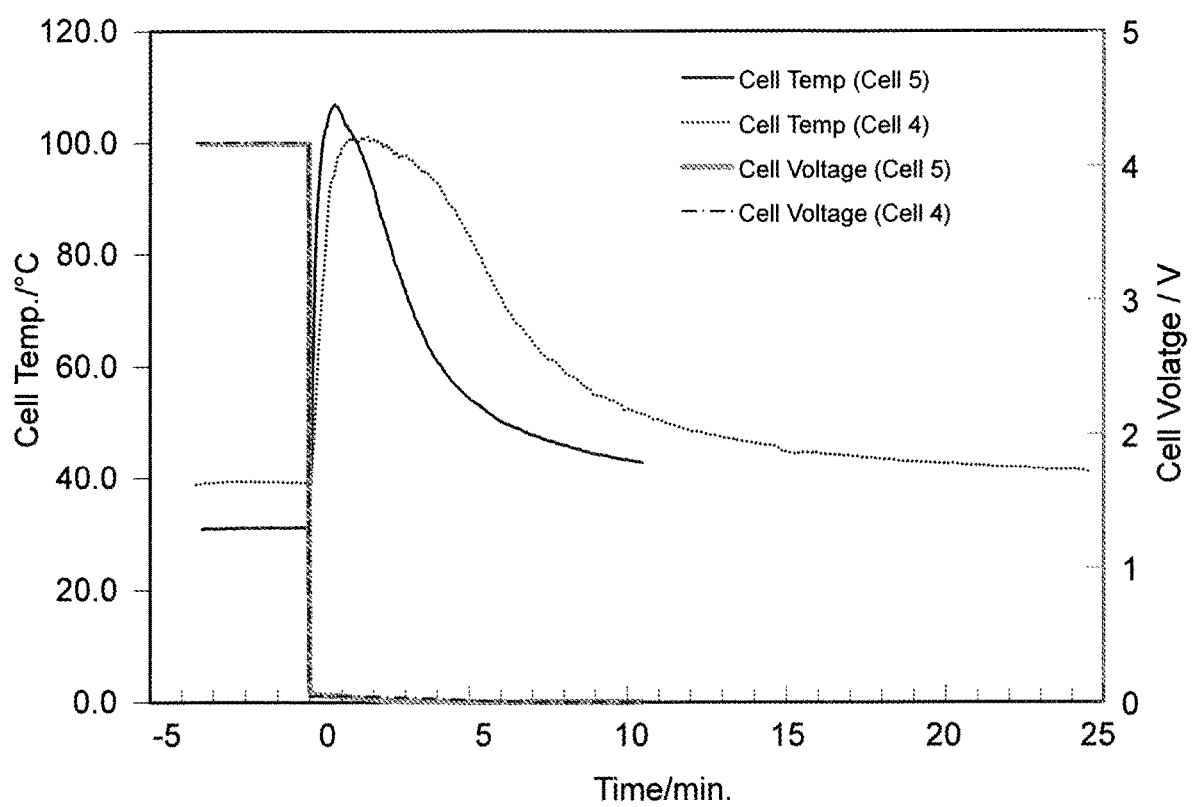
FIG. 16 illustrates the cell voltage and temperature vs the impact testing time for Cells 4 and 5. The impact starting time is set to zero. The cell voltage drop to zero voltage as soon as the cell is impacted. Then the cell temperature increases quickly. The temperature of the cell with the resistive layer increases much slowly than that of Cell 1 (see FIG. 14).

FIG. 9 presents the resistance in relation to the temperature increase for the positive electrode collected from autopsying a cell with 3.6 V. The resistance decreases about ten times. FIG. 11 shows the discharge capacity at the discharging currents 1, 3, 6, 10 A. FIG. 8 lists the cell impedance at 1 kHz and the capacity at 1 A, 3 A, 6 A and 10 A currents and the ratio of the capacity at 3, 6, 10 A over that at 1 A. FIG. 14 shows the cell temperature profile during the impact test. FIG. 15 summarizes the cell maximum temperature in the impact test. The cell caught fire during the impact test.

Example 2

Preparation of Al$_2$O$_3$ based resistive layer, positive and negative electrodes, and the completed Cell 3 for the evaluation in the resistance measurement, discharge capability tests at 50° C., impact test, and cycle life test are described below.

A) Positive POS3B as an Example of a Resistance Layer (1$^{st}$ Layer) Preparation.

i) Dissolve Torlon® 4000TF (1 g) into NMP (10 g); Dissolve PVDF (6 g) into NMP (70 g); iii) Mix solution prepared in Step i and ii, and then add carbon black (0.4 g) and mix for 10 min at 6500 rpm; iv) Add nano Al$_2$O$_3$ powder (42 g) to the solution from Step iii and mix for 20 min at the rate of 6500 rpm to form a flowable slurry; v) Coat this slurry onto 15 μm thick aluminum foil using an automatic coating machine with the first heat zone set to about 130° C. and the second heat zone to about 160° C. to evaporate off the NMP. The final dried solid loading is about 1 mg/cm$^2$.

B) Preparation of POS3 A as an example of the positive electrode preparation (2nd layer).

i) PVDF (21.6 g) was dissolved into NMP (250 g); Carbon black (18 g) was added and mixed for 15 min at 6500 rpm; LiNi$_{1/3}$Co$_{1/3}$Mn$_{1/3}$O$_2$ (NMC) (560.4 g) was added to the slurry from Step ii and mixed for 30 min at 6500 rpm to form a flowable slurry; iv) Some NMP was added for the viscosity adjustment; v) This slurry was coated onto POS3B (Example 2A) using an automatic coating machine with the first heat zone set to about 85° C. and the second heat zone to about 135° C. to evaporate off the NMP. The final dried solid loading was about 19.4 mg/cm$^2$. The positive layer was then compressed to a thickness of about 153 μm. The electrode made here is called as zero voltage against a standard graphite electrode and was used for the impedance measurement at 0 V in relation to the temperature.

C) Preparation of NEG3 A as an Example of the Negative Electrode Preparation i) CMC (13 g) was dissolved into deionized water (~1000 g); ii) Carbon black (20 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (945.92 g in total) was added to the slurry from Step ii and mixed for 30 min at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 gm thick copper foil using an automatic coating machine with the first heat zone set to about 100° C. and the second heat zone to about 130° C. to evaporate off the water. The final dried solid loading was about 11.8 mg/cm$^2$. The negative electrode layer was then compressed to a thickness of about 159 The negative made was used for the dry for the cell assembly.

D) Preparation of Cell for the Evaluation i) The electrodes were punched into the pieces with the electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was laid flat into an aluminum composite bag; v) The bag from Step iv. was dried in a 70° C. vacuum oven; vi) The bag from Step v was filled with the LiPF$_6$ containing organic carbonate based electrolyte; vii) The bag from Step vi was sealed; viii) Rested for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

Figure 10:
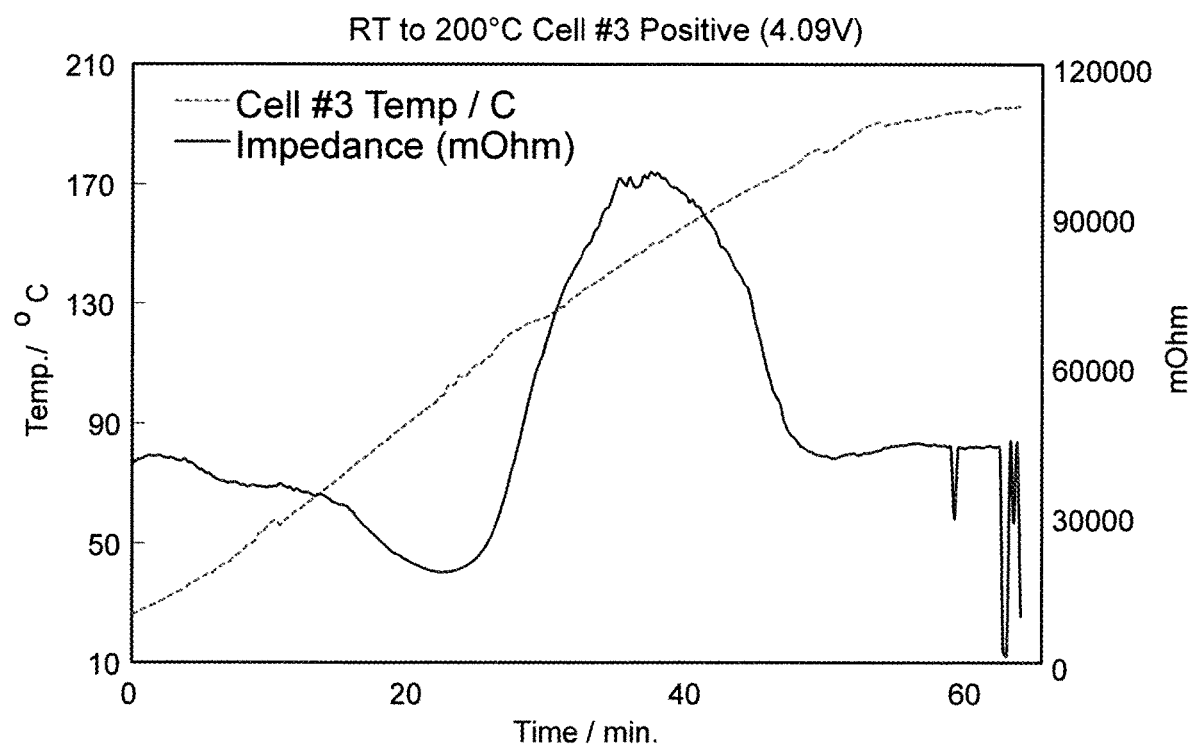
FIG. 10 illustrates the resistance of Cell 3 at 4.09V vs graphite in relation to the temperature increase. The resistance decreased slightly and increased by about 3 times and then decreased by about 3 times with the increase in the temperature.
Figure 17:
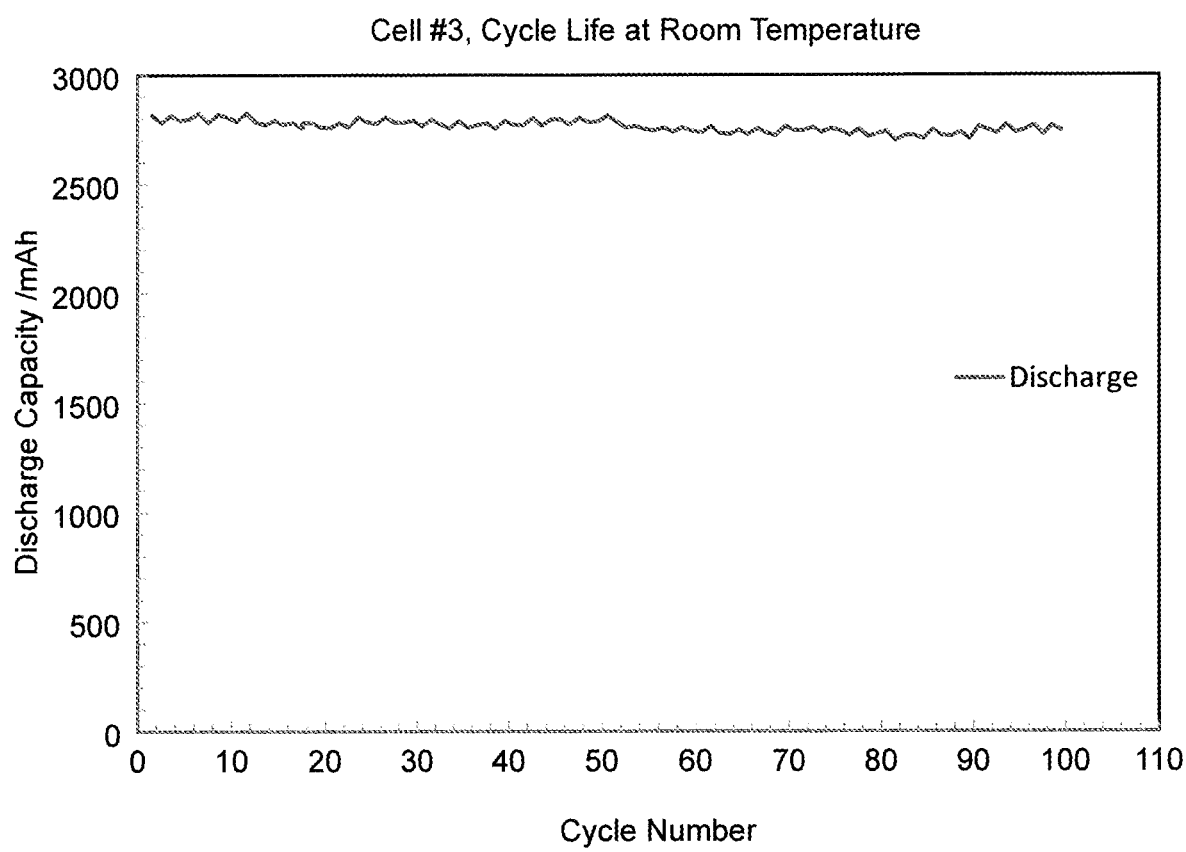
FIG. 17 illustrates the cycle life of Cell 3. The cell lost about 2% after 100 cycles which is similar to that of the cells without any resistive layer (~2.5% by average, not shown).

FIG. 10 presents the resistance in relation to the temperature increase for the positive electrode collected from autopsying a cell with 4.09V. The resistance changes very little compared with that (FIG. 9) of the baseline cell. FIG. 17 shows the discharge capacity vs. the cycle number. The cell lost about 2% capacity that is similar to that (2.5%) of the baseline cell. FIG. 8 lists the cell impedance at 1 kHz and the capacity at 1 A, 3 A, 6 A and 10 A currents and the ratio of the capacity at 3 A, 6 A, 10 A over that at 1 A. FIG. 14 shows the cell temperature profiles during the impact test. FIG. 15 summarizes the cell maximum temperature in the impact test.

Example 3

Preparation of 50% Polyacrylic latex and 50% Barium Tatanate (BaTiO2) based resistive layer, positive and negative electrodes, and the completed Cell 4 for the evaluation in the resistance measurement, discharge capability tests at 50° C., impact test, and cycle life test are described below.

A) Positive POS4B as an Example of a Resistance Layer ($1^{st}$ Layer) Preparation.

i) CMC (0.375 g) was dissolved into deionized water (~30 g); ii) The solution prepared in Step i was mixed, and then carbon black (1.75 g) was added and mixed for several minutes; iii) nano $BaTiO_2$ powder (25 g) was added to the solution from Step ii and mixed for 20 min at 6500 rpm to form a flowable slurry; v) This slurry was coated onto 15 µm thick aluminum foil using an automatic coating machine with the first heat zone set to about 90° C. and the second heat zone to about 140° C. to evaporate off the water. The final dried solid loading was about 0.7 mg/cm².

B) Preparation of POS4 A as an example of the positive electrode preparation ($2^{nd}$ layer).

i) PVDF (14.4 g) was dissolved into NMP (~160 g); ii) Carbon black (12 g) was added and mixed for 15 min at 6500 rpm; iii) $LiNi_{0.5}Mn_{0.3}Co_{0.2}O_2$ (NMC) (373.6 g) was added to the slurry from Step ii and mixed for 30 min at 6500 rpm to form a flowable slurry; iv) Some NMP was added for the viscosity adjustment; v) This slurry was coated onto POS4B (Example 2A) using an automatic coating machine with the first heat zone set to about 80° C. and the second heat zone to about 130° C. to evaporate off the NMP. The final dried solid loading was about 15.2 mg/cm². The positive layer was then compressed to a thickness of about 113 µm. The electrode made here was called as zero voltage against a standard graphite electrode and was used for the impedance measurement at 0 V in relation to the temperature.

C) Preparation of NEG3 A as an Example of the Negative Electrode Preparation i) CMC (7.8 g) was dissolved into deionized water (~800 g); ii) Carbon black (12 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (568.6 g in total) was added to the slurry from Step ii and mixed for 30 min at 6500 rpm to form a flowable slurry; iv) SBR (solid content 50% suspended in water) (25.2 g) was added to the slurry formed in Step iii and mixed at 6500 rpm for 5 min; v) The viscosity was adjusted for a smooth coating; vi) This slurry was coated onto 9 µm thick copper foil using an automatic coating machine with the first heat zone set to about 70° C. and the second heat zone to about 100° C. to evaporate off the water. The final dried solid loading was about 8.99 mg/cm². The negative electrode layer was then compressed to a thickness of about 123 µm. The negative made was used for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was laid flat into the aluminum composite bag; v) The bag from Step iv. was dried in a 70° C. vacuum oven; vi) The bag from Step v was filled with the $LiPF_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

Figure 12:
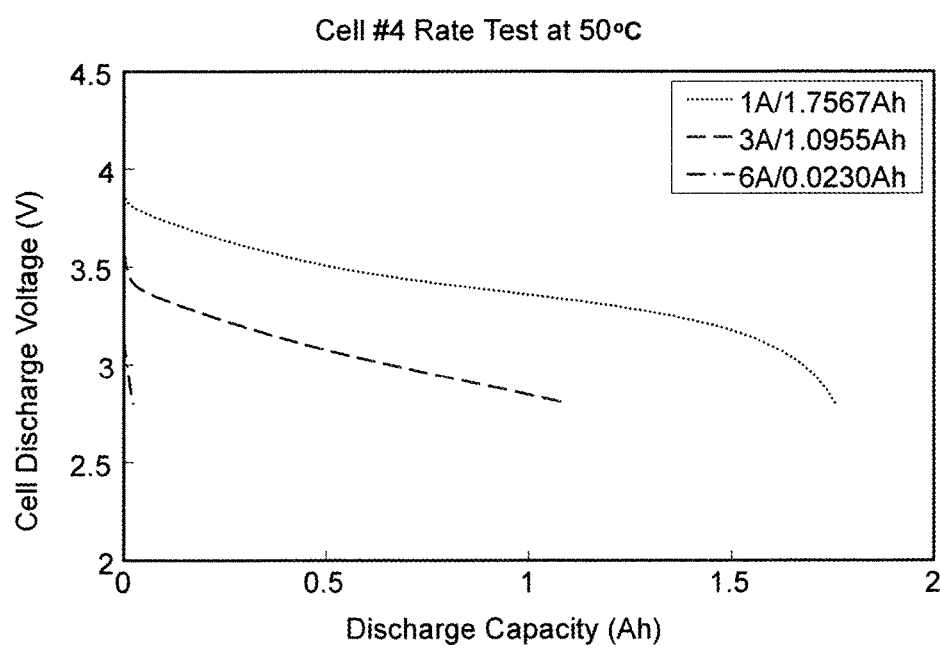
FIG. 12 illustrates the discharge capacity of Cell 4 vs the cell voltage at 1 A, 3 A, 6 A and 10A. The cell discharge capability decreases dramatically with the increase in the cell discharge current with this particular resistive layer.

FIG. 12 shows the discharge capacity at 1 A, 3 A, 6 A current and at 50° C. The cell capacity decreases very rapidly with the increase of the current, indicating the strong effect from the resistive layer. FIG. 8 lists the cell impedance at 1 kHz and the capacity at 1 A, 3 A, 6 A and 10 A currents and the ratio of the capacity at 3 A, 6 A, 10 A over that at 1 A. FIG. 14 shows the cell temperature profiles during the impact test. FIG. 15 summarizes the cell maximum temperature in the impact test.

Example 4

Preparation of resistive layer in negative electrodes, positive and negative electrodes, and the completed Cell 5 for the evaluation in the resistance measurement, discharge capability tests at 50° C., impact test, and cycle life test are described below.

A) Preparation of POS5 A as an example of the positive electrode preparation.

i) PVDF (31.5 g) was dissolved into NMP (~340 g); ii) Carbon black (13.5 g) was added and mixed for 15 min at 6500 rpm; iii) $LiNi_{0.33}Mn_{0.33}Co_{0.33}O_2$ (NMC) (855 g) was added to the slurry from Step ii and mix for 30 min at 6500 rpm to form a flowable slurry; iv) Some NMP was added for the viscosity adjustment; v) This slurry was added onto 15 µm aluminum foil using an automatic coating machine with the first heat zone set to about 80° C. and the second heat zone to about 130° C. to evaporate off the NMP. The final dried solid loading was about 14.8 mg/cm². The positive layer was then compressed to a thickness of about 113 µm. The electrode made here was designated as zero voltage against a standard graphite electrode and was used for the impedance measurement at 0 V in relation to the temperature, and the dry for the cell assembly.

B) Preparation of NEG5B as an Example of the Negative Electrode Preparation ($1^{st}$ Layer)

CMC (0.375 g) was dissolved into deionized water (~90 g); ii) Carbon black (1.75 g) was added and mixed for 15 min; $BaTiO_2$ (25 g in total) was added to the slurry from Step ii and mixed for 30 min at 6500 rpm to form a flowable slurry; iv) SBR (solid content 50% suspended in water) (45.6 g) was added to the slurry formed in Step iii and mixed at about 6500 rpm for 5 min; v) The viscosity was adjusted for a smooth coating; vi) This slurry was coated onto 9 µm thick copper foil using an automatic coating machine with the first heat zone set to about 90° C. and the second heat zone to about 140° C. to evaporate off the water.

C) Preparation of NEG5 A as an Example of the Negative Electrode Preparation ($2^{nd}$ Layer)

i) CMC (3.9 g) was dissolved into deionized water (~350 g); ii) Carbon black (6 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (283.8 g in total) were added to the slurry from Step ii and mixed for 30 min at 6500 rpm to form a flowable slurry; iv) SBR (solid content 50% suspended in water) (25.2 g) was added to the slurry formed in Step iii and mixed at 6500 rpm for 5 min;

v) The viscosity was adjusted for a smooth coating; vi) This slurry was coated onto NEG5B (Example 4B) using an automatic coating machine with the first heat zone set to about 70° C. and the second heat zone to about 100° C. to evaporate off the water. The final dried solid loading was about 9.8 mg/cm$^2$. The negative electrode layer was then compressed to a thickness of about 114 The negative made was used for the dry for the cell assembly.

D) Preparation of Cell for the Evaluation i) The electrodes were punched into the pieces with the electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was laid flat into the aluminum composite bag; v) The bag from Step iv. was dried in a 70° C. vacuum oven; vi) The bag from Step v was filled with the LiPF$_6$ containing organic carbonate based electrolyte; vii) The bag from Step vi was sealed; viii) Rest for 16 hours; ix) The cell was charged to 4.2V at C/20 rate for 5 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

FIG. 8 lists the cell impedance at 1 kHz and the capacity at 1 A, 3 A, 6 A and 10 A currents and the ratio of the capacity at 3 A, 6 A, 10 A over that at 1 A. FIG. 14 shows the cell temperature profile during the impact test. FIG. 15 summarizes the cell maximum temperature in the impact test.

Example 5

Preparation of Al$_2$O$_3$ and Sodium trisilicate (NaSiO$_3$) mixed based resistive layer, positive and negative electrodes, and the completed Cell 6 for the evaluation in the resistance measurement, discharge capability tests at 50° C., impact test, and cycle life test are described below.

A) Positive POS6B as an example of a resistance layer (1$^{st}$ layer) preparation.

i) Torlon® 4000TF (0.8 g) was dissolved into NMP (~10 g); ii) PVDF (4.8 g) was dissolved into NMP (60 g); iii) The solutions prepared in Step i and ii were mixed, and then carbon black (0.32 g) was added and mixed for 10 min at 6500 rpm; iv) nano Al$_2$O$_3$ powder (17.04 g) and NaSiO$_3$ (17.04 g) were added to the solution from Step iii and mixed for 20 min at 6500 rpm to form a flowable slurry; v) This slurry was coated onto 15 μm thick aluminum foil using an automatic coating machine with the first heat zone set to about 135° C. and the second heat zone to about 165° C. to evaporate off the NMP. The final dried solid loading was about 0.7 mg/cm$^2$.

B) Preparation of POS6 A as an example of the positive electrode preparation (2$^{nd}$ layer).

i) PVDF (21.6 g) was dissolved into NMP (270 g); ii) Carbon black (18 g) was added and mixed for 15 min at 6500 rpm; iii) LiNi$_{1/3}$Co$_{1/3}$Mn$_{1/3}$O$_2$ (NMC) (560.4 g) was added to the slurry from Step ii and mixed for 30 min at 6500 rpm to form a flowable slurry; iv) Some NMP was added for the viscosity adjustment; v) This slurry was coated onto POS6B (Example 1A) using an automatic coating machine with the first heat zone set to about 85° C. and the second heat zone to about 135° C. to evaporate off the NMP. The final dried solid loading was about 19.4 mg/cm$^2$. The positive layer was then compressed to a thickness of about 153 μm. The electrode made here was called as zero voltage against a standard graphite electrode and was used for the impedance measurement at 0 V in relation to the temperature.

C) Preparation of NEG6 A as an Example of the Negative Electrode Preparation i) CMC (13 g) was dissolved into deionized water (~1000 g); ii) Carbon black (20 g) was added and mixed for 15 min at 6500 rpm; iii) Negative active graphite (JFE Chemical Corporation; Graphitized Mesophase Carbon Micro Bead (MCMB) and Synthetic Graphite (TIMCAL) (945.92 g in total) were added to the slurry from Step ii and mix for 30 min at 6500 rpm to form a flowable slurry; iv) SBR (solid content 50% suspended in water) (42 g) was added to the slurry formed in Step iii and mixed at 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11.8 mg/cm$^2$. The negative electrode layer was then compressed to a thickness of about 159 μm. The negative made is ready for the dry for the cell assembly.

D) Preparation of Cell for the Evaluation i) The electrodes were punched into the pieces with an electrode tab; ii) The positive electrode was dried at 125° C. for 10 hours and negative electrode at 140° C. for 10 hours; iii) The positive and negative electrodes were laminated with the separator as the middle layer; iv) The flat jelly-roll made in the Step iii. was put into an aluminum composite bag; v) The bag from Step iv. was dried in a 70° C. vacuum oven; vi) The bag from Step v was filled with the LiPF$_6$ containing organic carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. Under vacuum, the cell was punctured to release any gases and then resealed. The cell made here was used for grading and other tests such as discharging capability test at 50° C., impact test, cycle life test and so on.

FIG. 8 lists the cell impedance at 1 kHz and the capacity at 1 A, 3 A, 6 A and 10 A currents and the ratio of the capacity at 3 A, 6 A, 10 A over that at 1 A. FIG. 14 shows the cell temperature profiles during the impact test. FIG. 15 summarizes the cell maximum temperature in the impact test.

Example 6

Preparation of CaCO$_3$ based gas generator layer, positive and negative electrodes, and the cell (#7) for the evaluation in the over charge test is described below. This gas generator layer could become a resistive layer if the conductive additive content is in the certain range such that the resistivity of the gas-generator layer is more resistive (50% more at least) than that of the energy layer or the layer that provide the majority (>50%) of the battery discharge energy. The gas generator content can be 2% to 99%.

A) Positive POS071 A as an example of a gas generator layer (1$^{st}$ layer) preparation.

i) Torlon® 4000TF (0.9 g) was dissolved into NMP (10 g); ii) PVDF (5.25 g) was dissolved into NMP (~68 g); iii) The solutions prepared in Step i and ii were mixed, and then carbon black (1.8 g) was added and mixed for 10 min at the rate of about 6500 rpm; iv) Nano CaCO$_3$ powder (7.11 g) and 134.94 g LiNi$_{0.33}$Mn$_{0.33}$Co$_{0.33}$O$_2$ were added to the solution from Step iii and mixed for 20 min at the rate of about 6500 rpm to form a flowable slurry; v) This slurry was coated onto 15 μm thick aluminum foil using an automatic coating machine with the first heat zone set to about 90° C. and the second heat zone to about 140° C. to evaporate off the NMP. The final dried solid loading was about 4 mg/cm$^2$.

B) Preparation of POS071B as an example of the positive electrode preparation (2nd layer).

i) PVDF (25.2 g) was dissolved into NMP (327 g); ii) Carbon black (21 g) was added and mixed for 15 min at the rate of about 6500 rpm; iii) LiNi$_{0.82}$Al$_{0.03}$Co$_{0.15}$O$_2$ (NCA) (649 g) was added to the slurry from Step ii and mixed for 30 min at the rate of about 6500 rpm to form a flowable slurry; iv) Some NMP was added for the viscosity adjustment; v) This slurry was coated onto POS071 A using an automatic coating machine with the first heat zone set to about 85° C. and the second heat zone to about 135° C. to evaporate off the NMP. The final dried solid loading is about 20.4 mg/cm$^2$. The positive layer was then compressed to a thickness of about 155 μm.

C) Preparation of NEG015B as an Example of the Negative Electrode Preparation i) CMC (15 g) was dissolved into deionized water (~951 g); ii) Carbon black (15 g) was added and mixed for 15 min at the rate of about 6500 rpm; iii) Negative active graphite (JFE Chemical Corporation; Graphitized Mesophase Carbon Micro Bead (MCMB) (945 g) was added to the slurry from Step ii and mixed for 30 min at the rate of about 6500 rpm to form a flowable slurry; iv) SBR (solid content 50% suspended in water) (50 g) was added to the slurry formed in Step iii and mixed at about 6500 rpm for 5 min; v) The viscosity was adjusted for a smooth coating; vi) This slurry was coated onto 9 μm thick copper foil using an automatic coating machine with the first heat zone set to about 100° C. and the second heat zone to about 130° C. to evaporate off the water. The final dried solid loading was about 11 mg/cm$^2$. The negative electrode layer was then compressed to a thickness of about 155 μm. The negative made is ready for the dry for the cell assembly.

D) Preparation of Cell for the Evaluation i) The electrodes were punched into the pieces with an electrode tab; ii) The positive electrode was dried at ~125° C. for 10 hr and negative electrode at ~140° C. for 10 hr; iii) The positive and negative electrodes were laminated with the separator as the middle layer; iv) The flat jelly-roll made in the Step iii was laid flat in an aluminum composite bag; v) The bag from Step iv. was dried in a 70° C. vacuum oven; vi) The bag from Step v was filled with the carbonate based electrolyte; vii) The bag from Step vi was sealed; viii) Rest for 16 hours; ix) The cell was charged to 4.2V at C/50 rate for 8 hours and then to 4.2V at 0.5 C rate for 2 hours, then rest for 20 minutes, then discharged to 2.8V at 0.5 C rate. The cell made here was used for grading and other tests such as over charge test.

Figure 18:
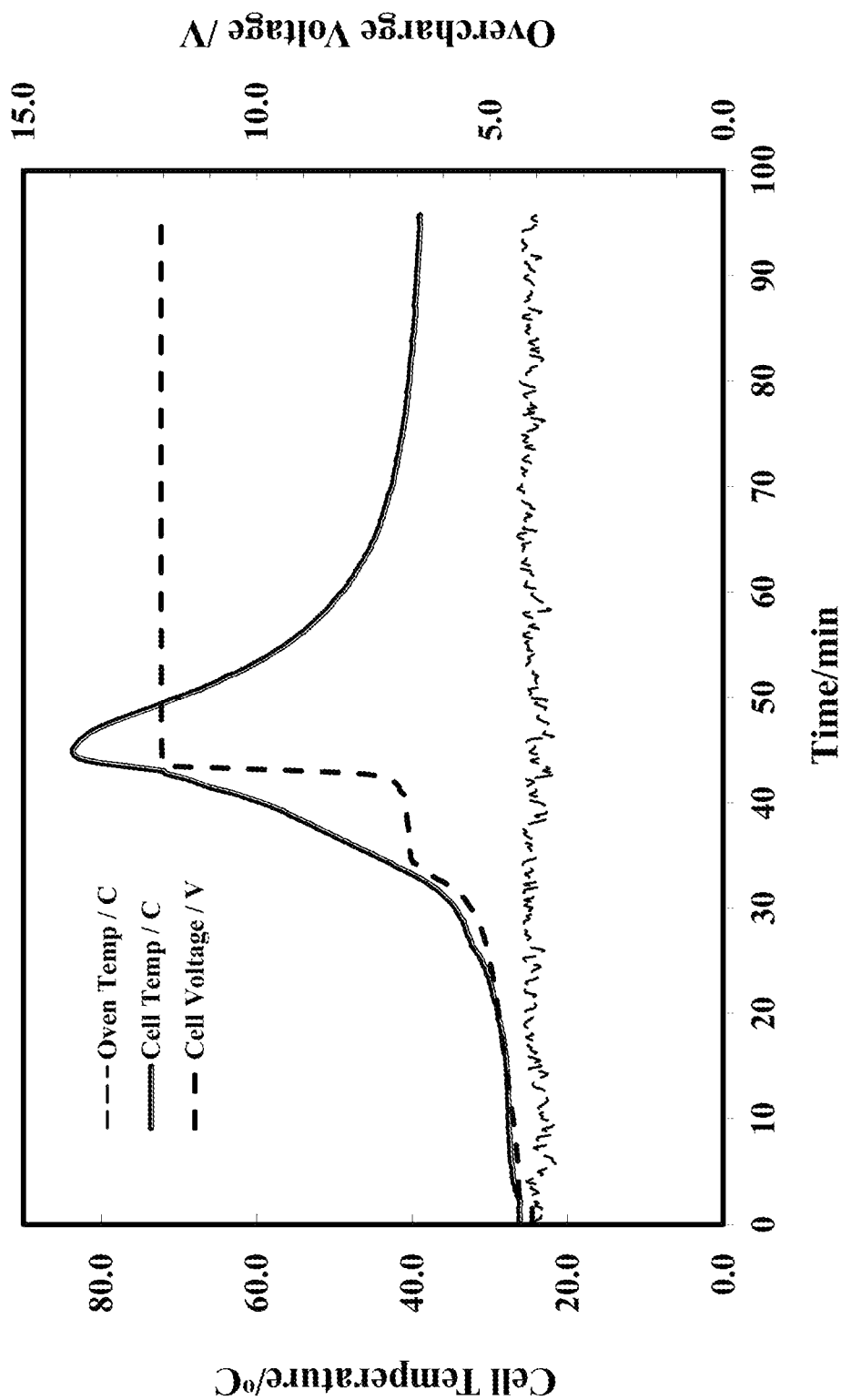
FIG. 18 shows cell temperature and overcharge voltage profiles during 2 A/12V overcharge test at room temperature.

FIG. 18 presents the overcharge voltage, cell temperature and oven chamber temperature during the overcharge test (2 A and 12V). The cell passed the over test nicely since the cell maximum temperature is about 83° C. during the overcharge test. Implementations of the current subject matter can include, but are not limited to, articles of manufacture (e.g. apparatuses, systems, etc.), methods of making or use, compositions of matter, or the like consistent with the descriptions provided herein.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A high energy density rechargeable (HEDR) battery comprising:
   an anode energy layer;
   a cathode energy layer;
   a separator between the anode energy layer and the cathode energy layer for preventing internal discharge thereof;
   at least one current collector for transferring electrons to and from either the anode or cathode energy layer, the anode and cathode energy layers each having an internal resistivity, the HEDR battery having a preferred temperature range for discharging electric current and an upper temperature safety limit; and
   a resistive layer interposed between the separator and one of the current collectors, the resistive layer configured to limit the rate of internal discharge through the separator in the event of separator failure and the generation of joule heat resulting therefrom, the resistive layer having a fixed resistivity at temperatures between the preferred temperature range and the upper temperature safety limit, the fixed resistivity of the resistive layer being greater than the internal resistivity of either energy layer, the resistive layer for avoiding temperatures in excess of the upper temperature safety limit in the event of separator failure.

2. The HEDR battery of claim 1 wherein the resistive layer is porous and comprises:
   a ceramic powder defining an interstitial space;
   a binder for partially filling the interstitial space for binding the ceramic powder; and a conductive component dispersed within the binder for imparting resistivity to the resistive layer, the interstitial space remaining partially unfilled for imparting porosity and permeability to the resistive layer.

3. The HEDR battery of claim 2 wherein the resistive layer is compressed to reduce the unfilled interstitial space and increase the binding of the ceramic powder by the binder.

4. The HEDR battery of claim 2 wherein the resistive layer comprises greater than 30% ceramic powder by weight.

5. The HEDR battery of claim 2 wherein the resistive layer comprises greater than 50% ceramic powder by weight.

6. The HEDR battery of claim 2 wherein the resistive layer comprises greater than 70% ceramic powder by weight.

7. The HEDR battery of claim 2 wherein the resistive layer comprises greater than 75% ceramic powder by weight.

8. The HEDR battery of claim 2 wherein the resistive layer comprises greater than 80% ceramic powder by weight.

9. The HEDR battery of claim 2 wherein the resistive layer is permeable to transport of ionic charge carriers.

10. The HEDR battery of claim 1 wherein the resistive layer is non-porous and has a composition comprising:
a non-conductive filler;
a binder for binding the non-conductive filler; and
a conductive component dispersed within the binder for imparting resistivity to the resistive layer.

11. The HEDR battery of claim 10 wherein the resistive layer is impermeable to transport of ionic charge carriers.

12. The HEDR battery of claim 1 wherein the fixed resistivity of the resistive layer is at least twice as great as the internal resistivity of either energy layer.

13. The HEDR battery of claim 12 wherein the fixed resistivity of the resistive layer is at least five times as great as the internal resistivity of either energy layer.

14. The HEDR battery of claim 12 wherein the fixed resistivity of the resistive layer is at least ten times as great as the internal resistivity of either energy layer.

15. The HEDR battery of claim 1 wherein the resistive layer lacks a physical phase transformation at temperatures between the preferred temperature range and the upper temperature safety limit for transforming the resistivity of the resistive layer.

16. The HEDR battery of claim 15 wherein the resistive layer lacks a transformation from solid phase to non-solid phase for transforming the resistivity of the resistive layer from low resistivity to high resistivity at temperatures between the maximum operating temperature and the upper temperature safety limit.

17. The HEDR battery of claim 1 wherein the resistive layer is non-sacrificial at temperatures below the upper temperature safety limit.

18. The HEDR battery of claim 17 wherein the resistive layer is sacrificial at temperatures above the upper temperature safety limit.

19. The HEDR battery of claim 18 wherein the resistive layer comprises a ceramic powder that chemically decomposes above the upper temperature safety limit for evolving a fire retardant gas.

20. The HEDR battery of claim 18 wherein the resistive layer comprises a ceramic powder that chemically decomposes above the upper temperature safety limit for evolving a gas for delaminating the current collector from the resistive layer.

* * * * *